United States Patent
Zandi et al.

(10) Patent No.: US 12,553,718 B2
(45) Date of Patent: Feb. 17, 2026

(54) OPTICAL GYROSCOPES AND METHODS OF MANUFACTURING OF OPTICAL GYROSCOPES

(71) Applicant: OSCPS MOTION SENSING INC., Montreal (CA)

(72) Inventors: Kazem Zandi, Montreal (CA); Richard Beaudry, Granby (CA)

(73) Assignee: OSCPS MOTION SENSING INC., Montreal (CA)

( * ) Notice: Subject to any disclaimer, the term of this patent is extended or adjusted under 35 U.S.C. 154(b) by 242 days.

(21) Appl. No.: 18/554,376

(22) PCT Filed: Jan. 11, 2022

(86) PCT No.: PCT/CA2022/050031
§ 371 (c)(1),
(2) Date: Oct. 6, 2023

(87) PCT Pub. No.: WO2022/217334
PCT Pub. Date: Oct. 20, 2022

(65) Prior Publication Data
US 2024/0183663 A1    Jun. 6, 2024

Related U.S. Application Data

(60) Provisional application No. 63/175,188, filed on Apr. 15, 2021.

(51) Int. Cl.
*G01C 19/66* (2006.01)
*G02B 6/12* (2006.01)
(Continued)

(52) U.S. Cl.
CPC ....... *G01C 19/661* (2013.01); *G02B 6/12007* (2013.01); *G02B 6/124* (2013.01);
(Continued)

(58) Field of Classification Search
CPC .... G01C 19/661; G01C 19/66; G01C 19/721; G02B 6/12007; G02B 6/124; G02B 6/132;
(Continued)

(56) References Cited

U.S. PATENT DOCUMENTS 6,282,219 B1 *  8/2001  Butler ................. G02B 6/124
                                                     372/50.1
7,106,919 B2 *  9/2006  Kochergin .......... G01R 15/246
                                                      385/12
(Continued)

FOREIGN PATENT DOCUMENTS

CN    103192800 A    9/2013
CN    112284370 A    1/2021

OTHER PUBLICATIONS

European Search Report from EP 22 78 7178, Apr. 28, 2025, Anastasiou, Ismini.
(Continued)

*Primary Examiner* — Mohamed K Amara
(74) *Attorney, Agent, or Firm* — BCF LLP

(57) ABSTRACT

An optical ring resonator-based gyroscope includes a photonic integrated circuit (PIC) chip including a plurality of optical elements, the plurality of optical elements including a resonator ring; and a printed circuit board including a plurality of electrical components, the photonic integrated circuit being mounted on a surface of the printed circuit board, the photonic integrated circuit and the printed circuit board being electrically connected. A photonic integrated circuit (PIC) chip including a substrate; a dielectric layer; a first waveguide layer forming at least: a ring resonator and reflector portions; a second waveguide layer forming at least: vertical Bragg grating couplers disposed over one of the plurality of reflector portions, a chip waveguide; a magneto-optic layer encapsulated in the dielectric layer; and
(Continued)

Legend:
- Substrate layer (210)
- Dielectric layer (290)
- 1st waveguide layer (292)
- Metal layer (298)
- 2nd waveguide layer (294)
- Magneto-Optical Layer (296)

a metal layer forming a plurality of metal connection pads and a plurality of wire traces for electrically connecting the PIC chip to electronic components.

13 Claims, 20 Drawing Sheets

(51) Int. Cl.
*G02B 6/124* (2006.01)
*G02B 6/132* (2006.01)
*G02B 6/136* (2006.01)

(52) U.S. Cl.
CPC ............ *G02B 6/132* (2013.01); *G02B 6/136* (2013.01); *G02B 2006/12104* (2013.01); *G02B 2006/12107* (2013.01); *G02B 2006/12121* (2013.01)

(58) Field of Classification Search
CPC .......... G02B 6/136; G02B 2006/12104; G02B 2006/12107; G02B 2006/12121
See application file for complete search history.

(56) References Cited

U.S. PATENT DOCUMENTS

| | | | |
|---|---|---|---|
| 2009/0153844 A1* | 6/2009 | Peter | G02B 6/29394 216/24 |
| 2011/0138902 A1* | 6/2011 | White | H04R 1/406 73/147 |
| 2015/0226918 A1 | 8/2015 | Bauters et al. | |
| 2018/0041743 A1* | 2/2018 | Ellwood, Jr. | G02F 1/09 |
| 2018/0122143 A1* | 5/2018 | Ellwood, Jr. | G06T 19/006 |
| 2019/0101392 A1 | 4/2019 | Bischel et al. | |
| 2019/0346705 A1* | 11/2019 | Soltani | H01S 5/34333 |
| 2020/0249205 A1 | 8/2020 | Novack et al. | |
| 2020/0284978 A1 | 9/2020 | Kharas et al. | |
| 2020/0386944 A1 | 12/2020 | Paniccia et al. | |
| 2021/0116246 A1 | 4/2021 | Paniccia et al. | |
| 2023/0133866 A1* | 5/2023 | Vermeulen | G02B 6/2938 435/6.19 |
| 2024/0206783 A1* | 6/2024 | Dubrovsky | A61B 5/14514 |
| 2024/0345326 A1* | 10/2024 | Mesaritakis | G02F 1/225 |
| 2025/0174963 A1* | 5/2025 | Kumar | H01S 5/1064 |

OTHER PUBLICATIONS

International Search report from PCT/CA2022/050031 dated Mar. 22, 2022; David E. Green.

English abstract of CN112284370 retrieved from Espacenet on Mar. 23, 2022.

English abstract of CN103292800 retrieved from Espacenet on Mar. 23, 2022.

* cited by examiner

OPTICAL GYROSCOPES AND METHODS OF MANUFACTURING OF OPTICAL GYROSCOPES

CROSS-REFERENCE

The present application claims priority to U.S. Provisional Patent Application No. 63/175,188, entitled "Optical Gyroscopes and Methods of Manufacturing of Optical Gyroscopes," filed Apr. 15, 2021, the entirety of which is incorporated herein by reference.

TECHNICAL FIELD

The present technology generally relates to gyroscopes. More specifically, the present application relates to optical ring resonator-based gyroscopes and methods of fabricating such gyroscopes.

BACKGROUND

As remote controlled and unmanned vehicles (such as drones) become more common, there is increasing interest in gyroscopes as sensors for measuring angular rotation. One type of gyroscope in the field of measuring angular velocity is optical gyroscopes, where the effect of rotation on light signals are monitored to detect rotational speed of an apparatus. In such devices, a light phase shift due to Sagnac effect is used to measure angular velocity.

Optical gyroscopes, for instance optical ring resonator-based optical gyroscopes, use optical elements, such as a laser, beam splitters, polarizers, phase modulators, circulators, resonators, and photodetectors. In order to provide accurate measurements, the various optical elements need to be precisely and stably aligned. In some cases, this can require bulky mechanical supports in order to precisely and reliably align the different optical elements.

Optical gyroscopes also require electrical or electronic elements, such as wave generators, lock-in amplifiers, and computer-implemented devices. These elements can be bulky, and the size of the different optical and electrical elements limit how small a gyroscope can be made. For many applications, however, smaller gyroscopes could be preferable (or necessary). All of the components, both optical and electrical/electronic, further require electrical connections to be made between the components.

Further, in order to manufacture gyroscopes at a high volume, alignment and electrical connection requirements may lead to many manipulation steps in fabrication (generally translating as cost).

There thus remains a desire for a gyroscope that overcome at least some of these inconveniences.

SUMMARY

It is an object of the present technology to ameliorate at least some of the inconveniences present in the prior art.

According to an aspect of the present disclosure, there is provided a gyroscope formed from an integrated optical chip (photonic integrated circuit (PIC) chip) and a printed circuit board, the chip and board being operatively (electrically and electronically) connected together.

In embodiments of a gyroscope chip of the present technology, as described herein, a resonant ring element for measuring angular velocity is integrated with a waveguide on a chip. The resonant ring and the waveguide are immovably attached to a substrate. Due to the full integration of all elements of the gyroscope on one chip, the gyroscope as described herein may be insensitive or less sensitive to environmental perturbations such as shocks and vibrations. Integrating the components of the gyroscope in one gyroscope chip, in certain embodiments, could result in reduction of noise and, therefore, better performance and reliability, compared to conventional optical gyroscopes. Further, by integrating not just the ring resonator and waveguide in the chip, but also additional optical elements (including phase modulators, isolator, polarizer, and couplers for coupling light into and out of the chip), the different optical elements are de-facto aligned by being fabricated in aligned positions. The different elements will therefore also maintain their alignment, as they are integrally connected together.

Similarly, the different electronic components of the gyroscope (lock-in amplifiers, microprocessor, and drivers) are all integrated on a printed circuit board in order to provide the electronic components in a compact packaging. The photonic integrated circuit is then mounted to and electrically connected to the electronic elements on the printed circuit board through wire-bonding techniques. Further the laser and photodetectors are connected to the PIC chip by flip chip bonding.

By using packaging methods known in the field of electronics packaging, such as wire bonding and flip-chip bonding, production time due to assembly can be reduced. Further, maximizing elements that can be printed by lithography (to reduce alignment assembly time) but excluding elements that can have more variable quality when printing (i.e. attaching a separate laser assembly) can further aid in minimizing production time while also aiding in minimizing fabrication costs.

According to embodiments described herein, the PIC chip further uses two waveguide layers: one for the ring resonator, one for the waveguide bus coupler and the other optical elements. This allows a flexible process flow where the ring resonator alignment to the waveguide bus coupler can be adjusted from one wafer to the other. This alignment changes the coupling efficiency, therefore the Q-factor of the ring resonator. In turn, it affects the precision of the gyroscope: higher Q-factor generally leads to higher precision, and higher signal to noise ratio. Therefore, different products with specific accuracy could be fabricated without being required to modify the photolithography layout mask at each product as it is usually the case in current state of the art PIC. Furthermore, having one layer for active optical components and a different layer for the ring resonator, allows for optimization of the properties of each layer for the benefit of their inherent components. In some embodiments, the ring resonator and the other optical component could also be within the same waveguide layer.

It should be understood that chemical deposition and other deposition techniques such as layer bonding, as described herein, of various layers on the substrate and other layers provides immovable attachment of the layers to the substrate and the other layers, respectively. The resulting immovable attachment of the ring resonator and its elements to the waveguide and its elements significantly reduces noise that may be caused by changes in the environment, such as, for example, vibrations or temperature change. Such reduction of noise allows for increase of Q-factor in the gyroscope chips as described herein.

According to one aspect of the present disclosure, there is provided an optical ring resonator-based gyroscope including a photonic integrated circuit (PIC) chip comprising a plurality of optical elements, the plurality of optical elements including a resonator ring; and a printed circuit board including a plurality of electrical components, the photonic integrated circuit being mounted on a surface of the printed circuit board, the photonic integrated circuit and the printed circuit board being electrically connected.

In some embodiments, the gyroscope further includes a laser assembly operatively connected to a top surface of the photonic integrated circuit, the laser assembly being optically coupled to the plurality of optical elements; and two photodetector assemblies operatively connected to the top surface of the photonic integrated circuit and optically coupled to the plurality of optical elements.

In some embodiments, the PIC chip includes a plurality of metal connection pads for electrically flip-chip bonding the laser assembly and the photodetector assemblies to the PIC chip.

In some embodiments, the laser assembly is a vertical-cavity surface-emitter laser (VCSEL) arranged and configured to optically couple light emitted therefrom into the plurality of optical elements.

In some embodiments, the printed circuit board includes a controller; a microprocessor; two waveform generators; and two lock-in amplifiers, each lock-in amplifier being communicatively connected to one of the waveform generators.

In some embodiments, the controller includes a proportional integral derivative (PID) controller.

In some embodiments, the PIC chip includes two optical phase modulators; and each of the waveform generators on the printed circuit board is operatively connected to one of the optical phase modulators.

In some embodiments, the printed circuit board further comprises an output communication port configured to connect the gyroscope to a computer-implemented system.

According to another aspect of the present disclosure, there is provided a photonic integrated circuit (PIC) chip for an optical ring resonator-based gyroscope, the PIC chip including a substrate; a dielectric layer deposited on the substrate; a first waveguide layer encapsulated in the dielectric layer, the first waveguide layer forming at least: a ring resonator, and a plurality of reflector portions; a second waveguide layer encapsulated in the dielectric layer, the first waveguide layer being disposed vertically between the substrate and the second waveguide layer, the second waveguide layer forming at least: a plurality of vertical Bragg grating couplers, each one of the plurality of vertical Bragg grating couplers being disposed over one of the plurality of reflector portions, a chip waveguide optically coupling the ring resonator to the plurality of vertical Bragg grating couplers; a magneto-optic layer encapsulated in the dielectric layer, the magneto-optic layer being arranged over a portion of the chip waveguide to form a plurality of circulators; and a metal layer disposed on the dielectric layer, the metal layer forming a plurality of metal connection pads and a plurality of wire traces for electrically connecting the PIC chip to electronic components.

In some embodiments, magneto-optic layer further form at least one optical isolator disposed along the chip waveguide.

In some embodiments, the plurality of metal connection pads includes a first pair of metal connection pads arranged to receive a laser assembly by flip-chip bonding; a second pair of metal connection pads arranged to receive a first photodetector assembly by flip-chip bonding; and a third pair of metal connection pads arranged to receive a second photodetector assembly by flip-chip bonding.

In some embodiments, the first pair of metal connection pads is arranged to align the laser assembly with a first one of the plurality of vertical Bragg grating couplers; the second pair of metal connection pads is arranged to align the first photodetector assembly with a second one of the plurality of vertical Bragg grating couplers; and the third pair of metal connection pads is arranged to align the second photodetector assembly with a third one of the plurality of vertical Bragg grating couplers.

According to one aspect of the present disclosure, there is provided a method for fabricating an optical ring resonator-based gyroscope, the method including acquiring a photonic integrated circuit (PIC) chip including a plurality of optical elements including a ring resonator, and a plurality of electrical contacts configured and arranged for receiving electrical connections; mounting a laser assembly to the PIC chip, the laser assembly being electrically and communicatively connected to the PIC chip by a first pair of contacts of the plurality of electrical contacts; mounting a first photodetector assembly to the PIC chip, the first photodetector assembly being electrically and communicatively connected to the PIC chip by a second pair of contacts of the plurality of electrical contacts; mounting a second photodetector assembly to the PIC chip, the second photodetector assembly being electrically and communicatively connected to the PIC chip by a third pair of contacts of the plurality of electrical contacts; connecting the PIC chip to a printed circuit board; and electrically coupling the printed circuit board and the PIC chip together via at least one or the plurality of electrical contacts of the PIC chip.

In some embodiments, mounting the laser assembly to the PIC chip comprises coupling the laser assembly to the first pair of contacts by a flip-chip bonding method.

In some embodiments, mounting the first photodetector assembly to the PIC chip comprises coupling the first photodetector assembly to the second pair of contacts by a flip-chip bonding method; and mounting the second photodetector assembly to the PIC chip comprises coupling the second photodetector assembly to the third pair of contacts by the flip-chip bonding method.

In some embodiments, mounting the laser assembly to the PIC chip further comprises aligning an emitting zone of the laser assembly with a first vertical Bragg grating coupler in the PIC chip.

In some embodiments, mounting the first photodetector assembly to the PIC chip further comprises aligning a receiving zone of the first photodetector assembly with a second vertical Bragg grating coupler in the PIC chip; and mounting the second photodetector assembly to the PIC chip further comprises aligning a receiving zone of the second photodetector assembly with a third vertical Bragg grating coupler in the PIC chip.

According to yet another aspect of the present disclosure, there is provided a method for fabricating a photonic integrated circuit for a ring resonator optical gyroscope, the method includes depositing a first dielectric layer to form a bottom waveguide cladding on a substrate; depositing a first waveguide material on portions of the first dielectric layer to form a first waveguide core layer, the first waveguide core layer forming: a ring resonator, and a plurality of lower reflector portions; depositing a second dielectric layer over the first waveguide core layer and portions of the first dielectric layer, the second dielectric layer forming a first top cladding for the first waveguide core layer; depositing a second waveguide material on portions of the second dielectric layer to form a second waveguide core layer, the second waveguide core layer forming: a plurality of vertical Bragg grating couplers, each of the vertical Bragg grating couplers being disposed over one of the plurality of lower coupler portions, and a chip waveguide optically coupling the ring resonator to the plurality of vertical Bragg grating couplers, depositing a magneto-optic material on portions of the second waveguide core layer, a combination of the magneto-optic material and portions of the second waveguide core layer forming at least one optical circulator optically coupled to the chip waveguide; and depositing a third dielectric layer over the second waveguide layer, the magneto-optical material, and portions of the second dielectric layer, the third dielectric layer forming a second top cladding layer for the second waveguide core layer. Each optical circulator has three optical connections that are connected to the phase modulator, to the ring resonator optical coupler and to the photodetector. In some embodiments, the optical circulators can be replaced by optical couplers made of at least one waveguide layer.

In some embodiments, the method further includes depositing a metal layer on portions of the third dielectric layer, the metal layer forming at least a plurality of electrical connection pads configured and arranged for receiving electrical connections.

In some embodiments, the second dielectric material and the third dielectric material are a same dielectric material.

In some embodiments, depositing the magneto-optic material includes forming an optical isolator on the chip waveguide. In some embodiments, depositing the magneto-optic material further includes forming at least one circulator on the chip waveguide. In some embodiments, depositing the magneto-optic material includes forming the optical isolator and the at least one circulator on the chip waveguide.

According to yet another aspect of the present disclosure, there is provided a photonic integrated circuit (PIC) chip for an optical ring resonator-based gyroscope. The PIC chip includes a substrate; and at least one dielectric layer disposed on the substrate; at least one waveguide layer encapsulated in the at least one dielectric layer, the first waveguide layer forming at least a waveguide; a spiral-form resonator ring; and a bus coupler arranged to optically couple the waveguide to the spiral-form resonator ring.

In some embodiments, a length of the spiral-form ring resonator is at least 3 meters.

In some embodiments, the substrate is formed from a glass wafer.

In some embodiments, the glass wafer is formed from one of: fused silica; quartz; and borosilicate.

In some embodiments, the spiral-form resonator ring is a generally rectangular, nested spiral. In some embodiments, the spiral-form resonator is a closed-loop multi-spiral form having at least three interconnected spiral lobes. In some embodiments, the spiral-form resonator is a closed-loop multi-spiral form having at least four interconnected spiral lobes. In some embodiments, the spiral-form resonator is a closed-loop spiral form having at a portion that traverses at least one loop of the spiral-form.

In some embodiments, the chip further includes an integrated laser chip optically coupled to the at least one waveguide, the integrated laser chip being disposed in a recess formed by at least the dielectric material.

In some embodiments, the chip further includes at least one filter element optically coupled to the integrated laser chip, the at least one filter element being formed by the waveguide material, the integrated laser chip is configured to produce broadband illumination; and the filter element is configured to select a narrow wavelength band of the broadband illumination, and optically couple the narrow wavelength band of illumination to the at least one waveguide.

In some embodiments, the at least one filter element is based on at least one of a ring resonator and a Fabry-Perot filter.

According to yet another aspect of the present disclosure, there is provided a method for fabricating a photonic integrated circuit chip for a ring resonator optical gyroscope. The method includes depositing a waveguide material on portions of a substrate to form a waveguide core layer, the substrate forming a bottom waveguide cladding for the waveguide material, the waveguide core layer forming a ring resonator; and depositing a dielectric layer over the waveguide core layer and portions of the substrate, the dielectric layer forming a top cladding for the waveguide core layer.

In some embodiments, the method further includes bonding a glass wafer to the dielectric layer.

In some embodiments, the waveguide layer is a first waveguide layer and the dielectric material is a first dielectric material. The method further includes depositing a second waveguide material on portions of the first dielectric layer to form a second waveguide core layer, the second waveguide core layer including at least an optical bus coupler arranged to optically couple to the ring resonator; and depositing a second dielectric layer over the second waveguide layer.

In some embodiments, the method further includes bonding a glass wafer to the second dielectric layer.

In some embodiments, the method further includes performing chemical-mechanical polishing on a top surface following at least one of depositing the first dielectric material; depositing the second dielectric material; depositing the first waveguide material; and depositing the second waveguide material.

In some embodiments, depositing the waveguide material on portions of the substrate comprises creating the waveguide layer using a Damascene process flow, including etching at least one groove in the substrate; depositing the waveguide material over portions of the substrate including the at least one groove; and performing chemical-mechanical polishing to remove excess portions of the waveguide material deposited exterior to the at least one groove.

In some embodiments, the method further includes depositing at least one oxide layer prior to depositing the waveguide layer, the substrate being at least one of a silicon wafer with at least 15 micrometer thick wet thermal oxide; and a silicon wafer with oxide deposited thereon by multiple flame hydrolysis deposition (FHD) method.

In some embodiments, the waveguide layer is a first waveguide layer; the dielectric material is a first dielectric material; the first waveguide layer further forms a plurality of lower coupler portions; and the method further includes depositing a second waveguide material on portions of the second dielectric layer to form a second waveguide core layer, the second waveguide core layer forming: a plurality of vertical Bragg grating couplers, each of the vertical Bragg grating couplers being disposed over one of the plurality of lower coupler portions, and a chip waveguide optically coupling the ring resonator to the plurality of vertical Bragg grating couplers, depositing a magneto-optic material on portions of the second waveguide core layer, a combination of the magneto-optic material and portions of the second waveguide core layer forming at least one optical circulator optically coupled to the chip waveguide; and depositing a third dielectric layer over the second waveguide layer, the magneto-optical material, and portions of the second dielectric layer, the third dielectric layer forming a second top cladding layer for the second waveguide core layer.

In some embodiments, the substrate is a first glass wafer; and the method further includes depositing a second dielectric layer on a second glass wafer; depositing a second waveguide material on portions of the second dielectric layer to form a second waveguide core layer; and bonding the second glass wafer to the first glass wafer via the second dielectric layer and the first dielectric layer.

In some embodiments, forming the waveguide layer further includes forming at least an optical bus coupler arranged to optically couple to the ring resonator.

In some embodiments, forming the waveguide layer further includes forming two optical bus couplers arranged to optically couple to the ring resonator.

In some embodiments, the method further includes etching a recess in at least a portion of the dielectric material; and integrating a III-V laser chip into the recess.

In some embodiments, the method further includes forming, in the waveguide material, at least one filter element, the at least one filter element being optically coupled to the laser chip; and forming, in the waveguide material, a waveguide extending from at least the laser chip to the ring resonator, at least a portion of the waveguide being disposed adjacent to the at least one filter element.

In some embodiments, the method further includes depositing a thin layer of silicon nitride subsequent to silicon nitride etching to further smooth sidewall roughness of etched silicon nitride waveguides.

In some embodiments, wherein the substrate is formed from silicon and a top cladding is formed from an oxide, the method further includes etching through all deposited layers to reach the silicon substrate; and performing an isotropic dry etch of the silicon using XeF2 gas.

The terms "photonic integrated circuit chip," "PIC chip," "chip for an optical gyroscope," and "chip" are used herein interchangeably. As used herein, the term "immovably attached" refers to an attachment in a manner that cannot be readily detached during use, for example, a chemical attachment using deposition techniques or adhesive.

The term "deposit" in reference to fabrications methods, as used herein, refers broadly to methods and processes of mechanically and/or chemically applying a material to one or more desired locations, or as a layer, on a surface. The methods and processes encompassed by the term "deposit" herein include but are not limited to: spin-coating, photoresist development and etching, photolithography, electron-beam lithography, thermal oxidation, plasma etching, low pressure chemical vapor deposition, plasma enhanced chemical vapor deposition, and physical vapor deposition.

Directions or orientations used herein, such as above, below, left and right, refer to relative positioning of components of the gyroscope as seen from a plan, overhead view of the components with light input being arranged at the "top" and light detection being arranged at the "bottom", except where otherwise noted. Components of the gyroscope, when described separately from the gyroscope, maintain the same descriptive orientation as it would have when installed on the gyroscope. It is noted that these relative directions are used for simplicity of description only, and the gyroscope and components thereof are contemplated to be used in any number of orientations.

Implementations of the present disclosure each have at least one of the above-mentioned objects and/or aspects, but do not necessarily have all of them. It should be understood that some aspects of the present disclosure that have resulted from attempting to attain the above-mentioned object may not satisfy this object and/or may satisfy other objects not specifically recited herein.

Additional and/or alternative features, aspects and advantages of implementations of the present disclosure will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
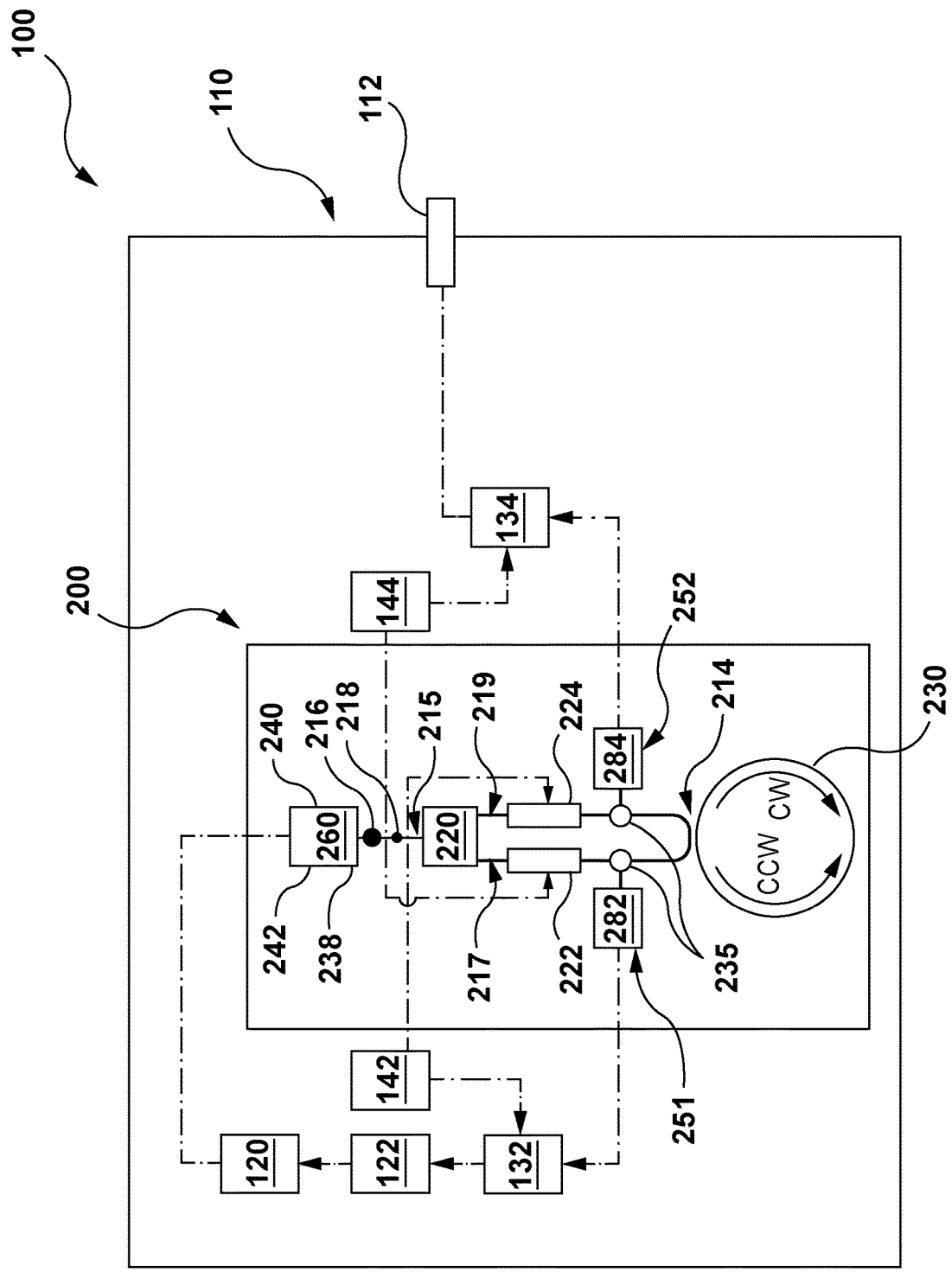
FIG. 1 is a top plan view schematic diagram of an optical ring resonator-based gyroscope in accordance with various embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims. It should be noted that the Figures may not be drawn to scale, except where otherwise noted.

DETAILED DESCRIPTION

The present disclosure is directed to systems, methods and apparatuses to address the deficiencies of the current state of the art.

Figure 2:
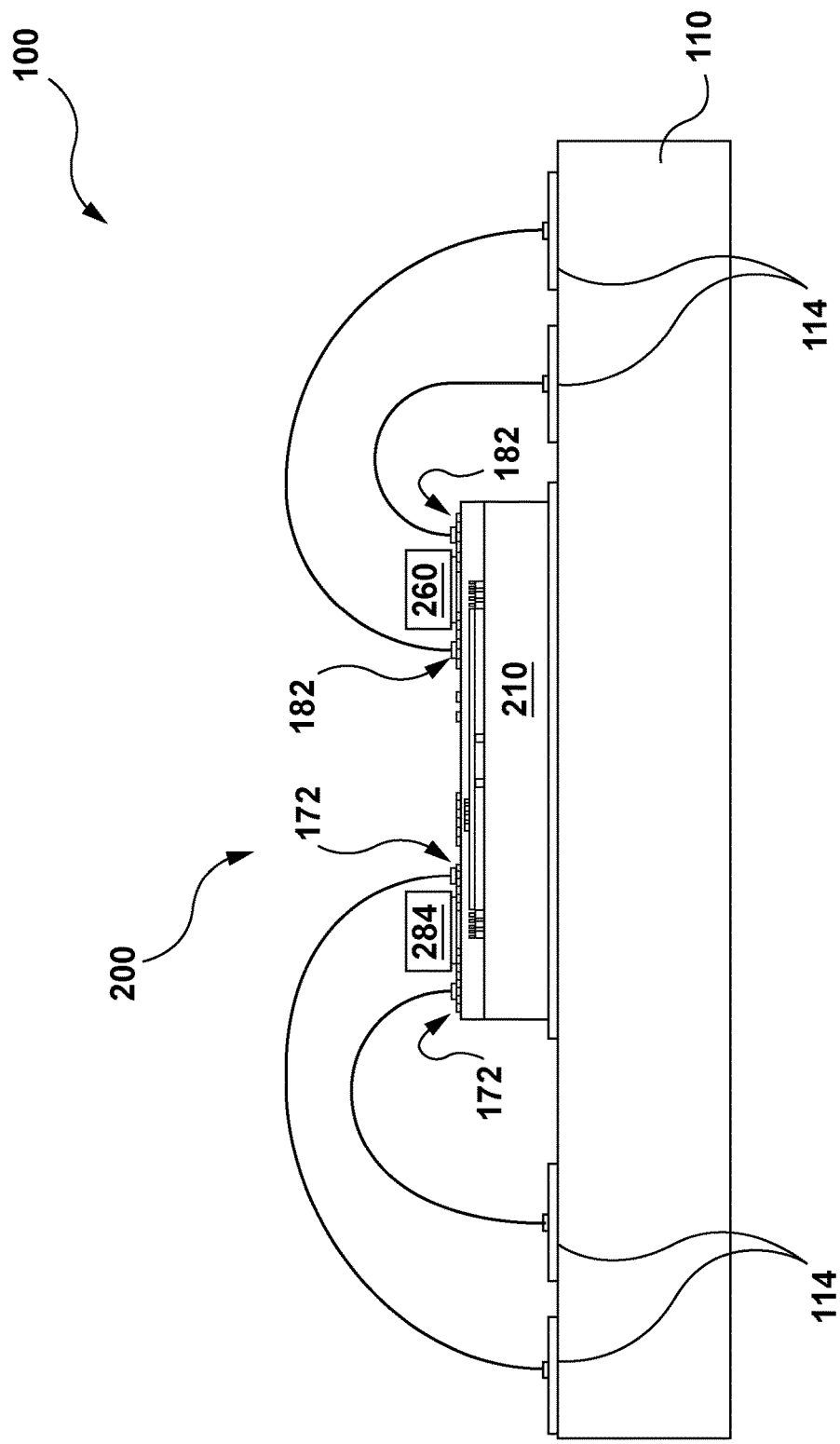
FIG. 2 is a side elevation view of the optical ring resonator-based gyroscope of FIG. 1.

With reference to FIGS. 1 and 2, an optical ring resonator-based gyroscope 100 according to embodiments of the present technology will be described.

The gyroscope 100 is formed from a printed circuit board (PCB) 110 and a photonic integrated circuit (PIC) chip 200. As will be described in more detail below, the PCB 110 includes electronic components of the gyroscope 100, while the PIC chip 200 includes optical components thereof.

Specifically, the PIC chip 200 is disposed on and connected to the PCB 110. As is illustrated in FIG. 2, the PIC chip 200 is mounted to a top surface of the PCB 110. In the present embodiment, the PIC chip 200 is glued to the PCB 110, but it is contemplated that the PIC chip 200 and the PCB 110 could be differently connected together in different embodiments. The PIC chip 200 could be adhered to the PCB 110 by, for example, using conductive glue, eutectic bonding and solder bump bonding. As will also be detailed further below, the PIC chip 200 is also electrically connected to the PCB chip 110 to power at least some of the optical components contained therein.

The gyroscope 100 further includes a tunable laser assembly 260 connected to a top surface of the PIC chip 200. The gyroscope 100 also includes two photodetector assemblies 282, 284 connected to a top surface of the PIC chip 200. Both the laser assembly 260 and the photodetector assemblies 282, 284 are described in more detail below. In some embodiments, it is contemplated that the PIC chip 200 and the PCB 110 could be provided without the laser assembly 260 and the photodetector assemblies 282, 284, for instance as an assembly for building a gyroscope with custom-chosen lasers and/or detectors.

Figure 3:
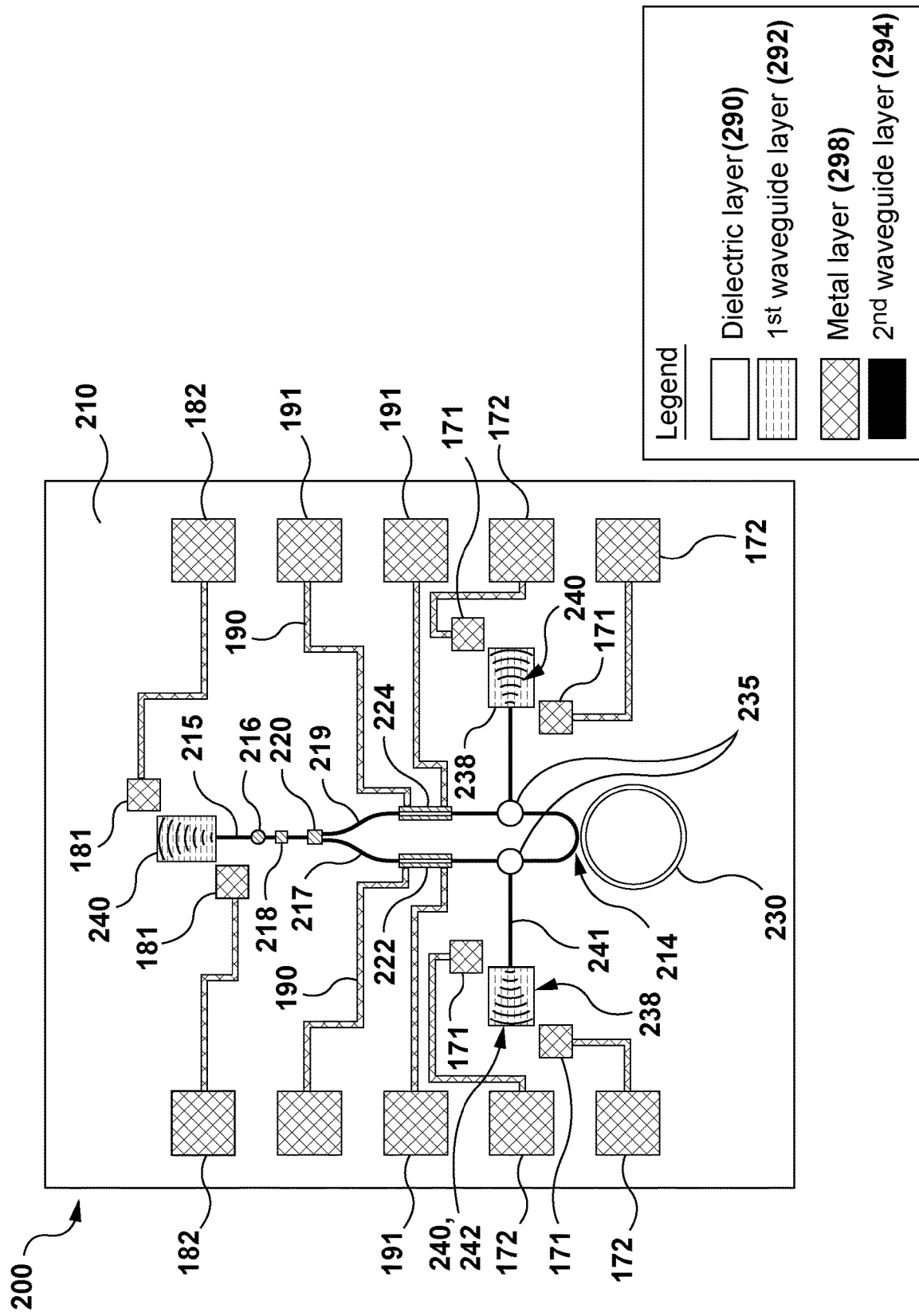
FIG. 3 is a top plan view schematic diagram of a photonic integrated circuit chip of the gyroscope of FIG. 1.
Figure 4:
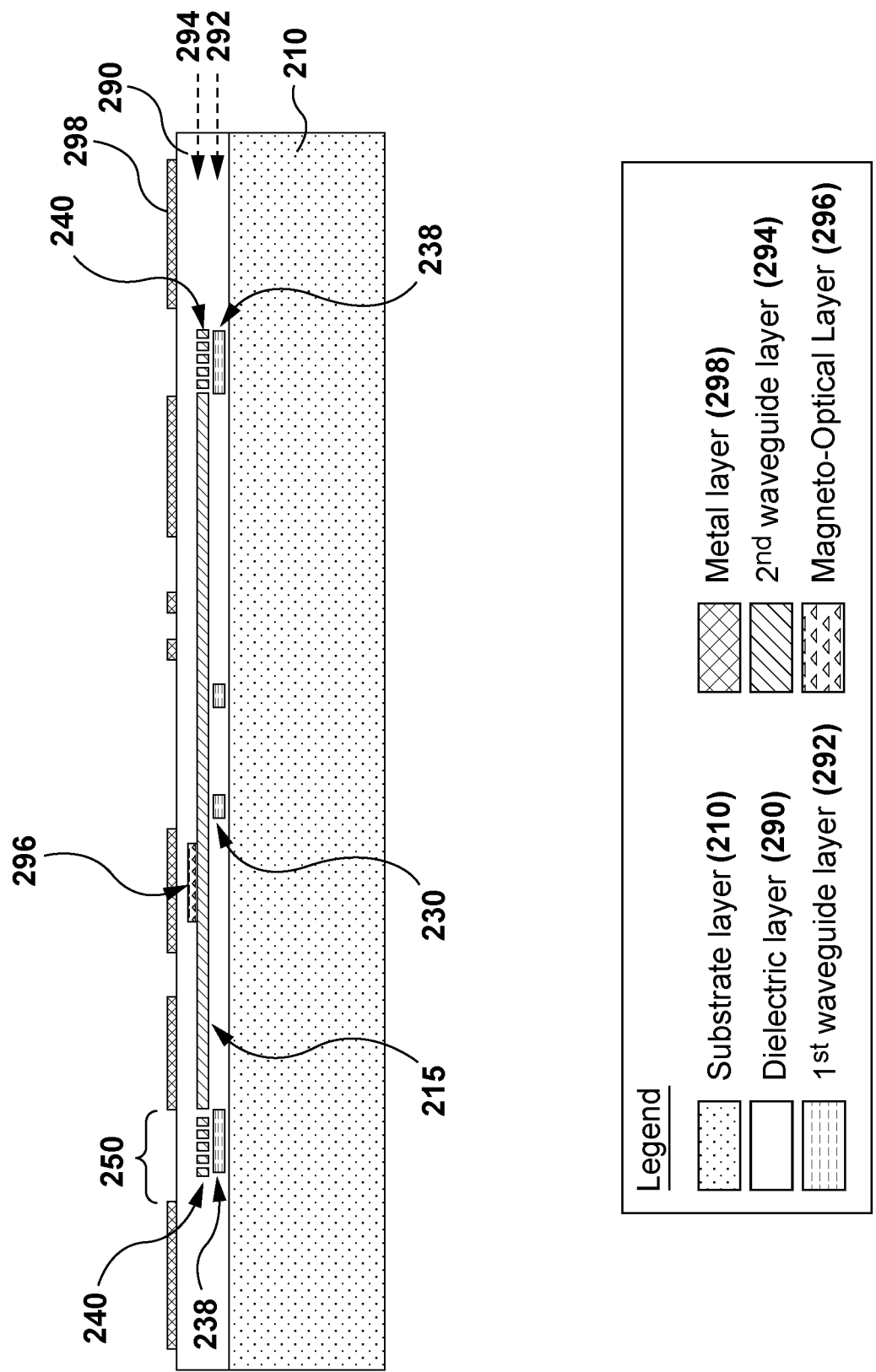
FIG. 4 is a side elevation, a partially transparent view of the photonic integrated circuit chip of FIG. 3.

With additional reference to FIGS. 3 and 4, the photonic integrated circuit (PIC) chip 200 is illustrated in more detail. Broadly, the PIC chip 200 is a silicon chip with a plurality of optical elements integrally formed therein. By forming the optical elements directly into the chip 200, relative alignment of the different optical components during fabrication is simplified and preserved over time, compared to fabricating a gyroscope using free-space or fibered optics.

The PIC chip 200 includes a substrate 210 for receiving different material layers to form the optical elements of the chip 200. The substrate 210 is formed from a silicon wafer. In some embodiments, the substrate 210 could be made of various materials, including but not limited to: silicon, glass wafer, quartz, germanium, fused silica, borosilicate, and various semiconductor or ceramic materials, as would be known to someone of skill in the art.

Deposed on top of the substrate 210 is a series of material layers which form the optical elements of the PIC chip 200. Each of the layers and a method of fabrication of the PIC chip 200 will be described in more detail below. Briefly, starting from the top surface of the substrate going upward, the layers deposed on the substrate 210 are: a dielectric layer 290, a lower waveguide layer 292 (encapsulated in the dielectric layer 290), an upper waveguide layer 294, a magneto-optic material layer 296 (the second waveguide layer 294 and the magneto-optic material layer 296 being encapsulated together in the dielectric layer 290), and a metal layer 298 on a top surface of the dielectric layer. It should be noted that the above-mentioned layers do not necessarily extend an entire surface of the substrate 210. It is also noted that while the dielectric layer 290 is illustrated as one total layer, the dielectric layer 290 is formed by multiple applications of the dielectric material (for instance by chemical deposition or spin-coating), following deposition of the lower waveguide layer 292 and the magneto-optic material layer 296. It is contemplated that the dielectric layer 290 could be formed from a plurality of different dielectric materials in some embodiments. It is further contemplated that the optical components could all be formed in a one same waveguide layer. The dielectric layer 290 is also referred to as a cladding layer 290. As will be described in further detail below, in at least some embodiments portions of the dielectric layer 290 disposed between the substrate 210 and the first waveguide layer 292 could be omitted, with the substrate 210 provide the bottom cladding to the first waveguide layer 292 directly.

The PIC chip 200 includes a chip waveguide 215 formed at least in part by the upper waveguide layer and the dielectric layer. The waveguide 215 is illustrated in black solid line in FIGS. 1 and 3. A core of the waveguide 215 is formed by upper waveguide layer 294, which is cladded by the dielectric material layer encapsulating the waveguide 215. The waveguide 215 provides optical coupling between the different optical elements in the PIC chip 200, including receiving light from the laser assembly 260, coupling light to a resonator ring 230, and coupling light out to two photodetectors 282, 284. These components and the pattern of light propagation will be described in more detail below.

The PIC chip 200 includes an optical resonator ring 230 formed therein within, which is a circular waveguide 230. A core of the ring 230 is formed by the lower waveguide material layer 292, with cladding provided by the dielectric material layer 290 encapsulating the ring 230. As will be described in more detail below, the resonator ring 230 is provided to allow light to circulate (resonate), in two opposite directions.

In the present embodiment, the lower waveguide layer 292, including forming the ring 230, is formed using silicon nitride. Depending on the embodiment, the lower waveguide layer could be formed from various materials, including but not limited to: silicon oxide, silicon, InP, and CaF2. The particular material choice depends at least in part on transparency and low propagation loss in the wavelength of interest for a given embodiment. Similarly, the particular cladding material (in this case the dielectric layer) of the present embodiment is silicon oxide, but other materials could be used. For instance, silicon oxynitride, polymer, and other low refractive index materials, could be used in some embodiments, or one of a variety of materials that have a significantly lower refractive index than the corresponding waveguide material. It is also contemplated that cladding could be provided by air surrounding the waveguide ring 230 (as well as other waveguide-type components of the present technology).

The optical resonator ring 230 is in the form of one ring (referred to as a looped waveguide) in the present embodiment, but it is contemplated that the ring 230 could be formed from many rings optically coupled to each other. In the case of many rings, an optical path length of the perimeter for each ring could be identical.

Figure 13:
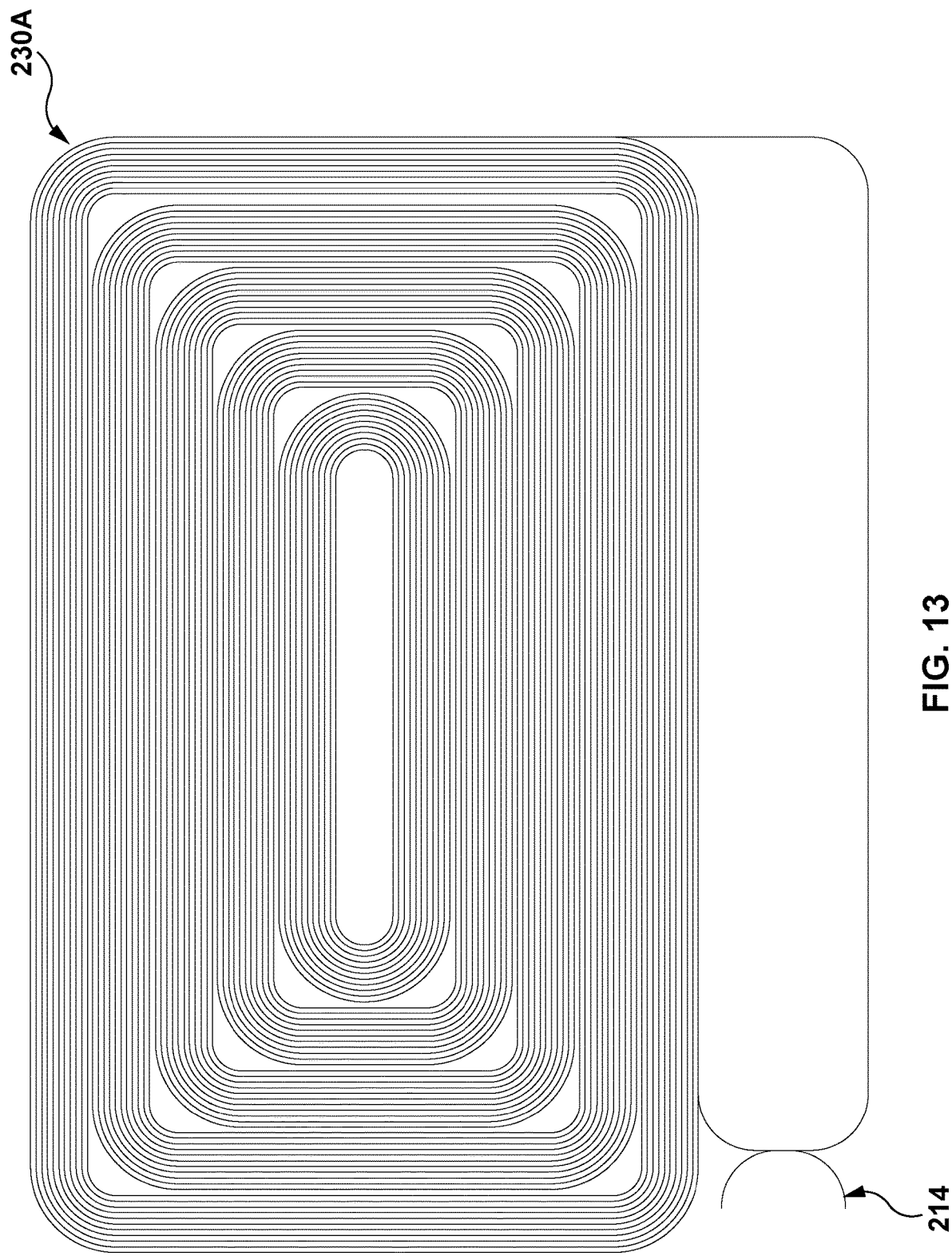
FIGS. 13 and 14 illustrate top schematic views of non-limiting embodiments of spiral-form resonant rings for use in the photonic integrated circuit chip of FIG. 3.
Figure 14:
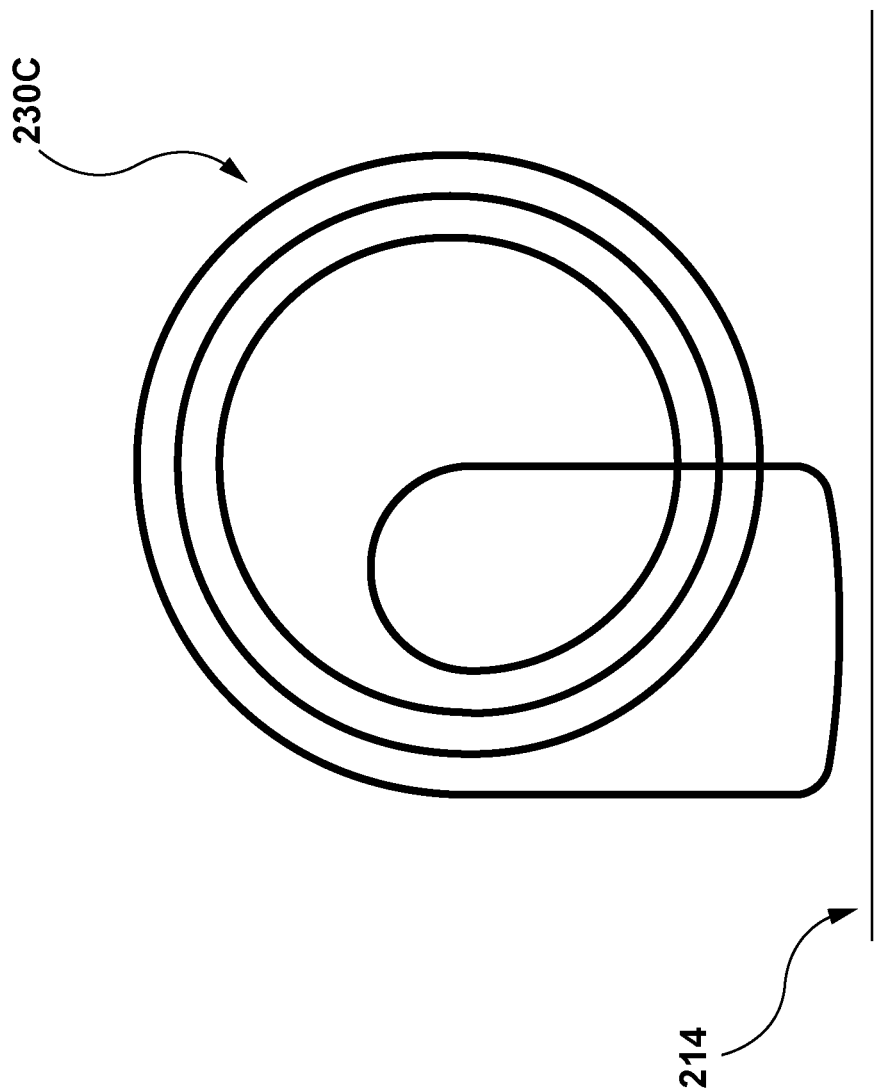

In some embodiments, the ring 230 may not be circular. With reference to FIGS. 13 and 14, additional non-limiting example embodiments of different forms of resonator rings that could be implemented in place of the ring 230 are illustrated, specifically different forms of a spiral-form resonator rings. With reference to FIG. 13, in some embodiments the chip 200 could include a generally rectangular, nested spiral resonator 230A. In the illustrated example, the resonator 230A includes five groupings of windings of waveguide material, but the exact number of loops and their relative shaped could vary, depending on the particular application or design. The length of the resonator 230A is at least 3 meters in the illustrated embodiment, although the exact length could vary.

With reference to FIG. 14, in at least some non-limiting embodiments the chip 200 could include a spiral-form resonator 230C which is a closed-loop spiral form having at a portion that traverses at least one loop of the spiral-form. Also referred to as an "arm" of the resonator form, one portion of resonator 230C traverses the loops of the resonator 230C. It is also contemplated that the resonator could have multiple interconnected spiral loops (not shown).

Figure 15:
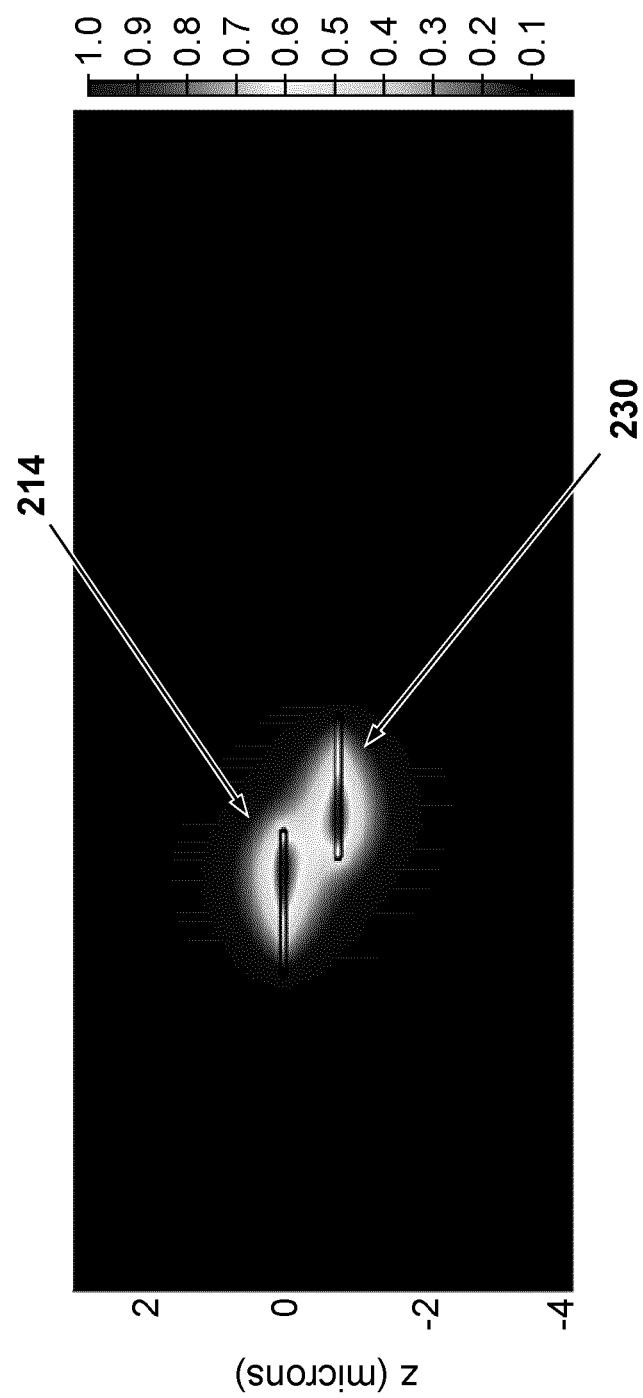
FIG. 15 is a partial, cross-sectional view of the photonic integrated circuit chip of FIG. 3, displaying a simulation of light coupled vertically from a bus waveguide to a ring resonator.

The chip waveguide 215 includes a bus coupler portion 214 for coupling light from the waveguide 215 to the ring resonator 230. The bus coupler portion 214 is configured and arranged to provide evanescent coupling between the portion 214 and the ring 230, due specifically to the relative curvatures and proximity of the portion 214 and the ring 230, further illustrated in FIG. 15 when the bus coupler 214 is vertically placed on top of ring resonator 230. In some embodiments, however, the waveguide 215 and the ring 230 could be coupled together by a multi-mode interferometer or one of a variety of other types of splitters. For the additional non-limiting embodiments, each ring 230A, C is illustrated being arranged adjacent to the bus coupler 214 arranged to optically couple the waveguide 215 to the resonator ring 230A, C.

Figure 6:
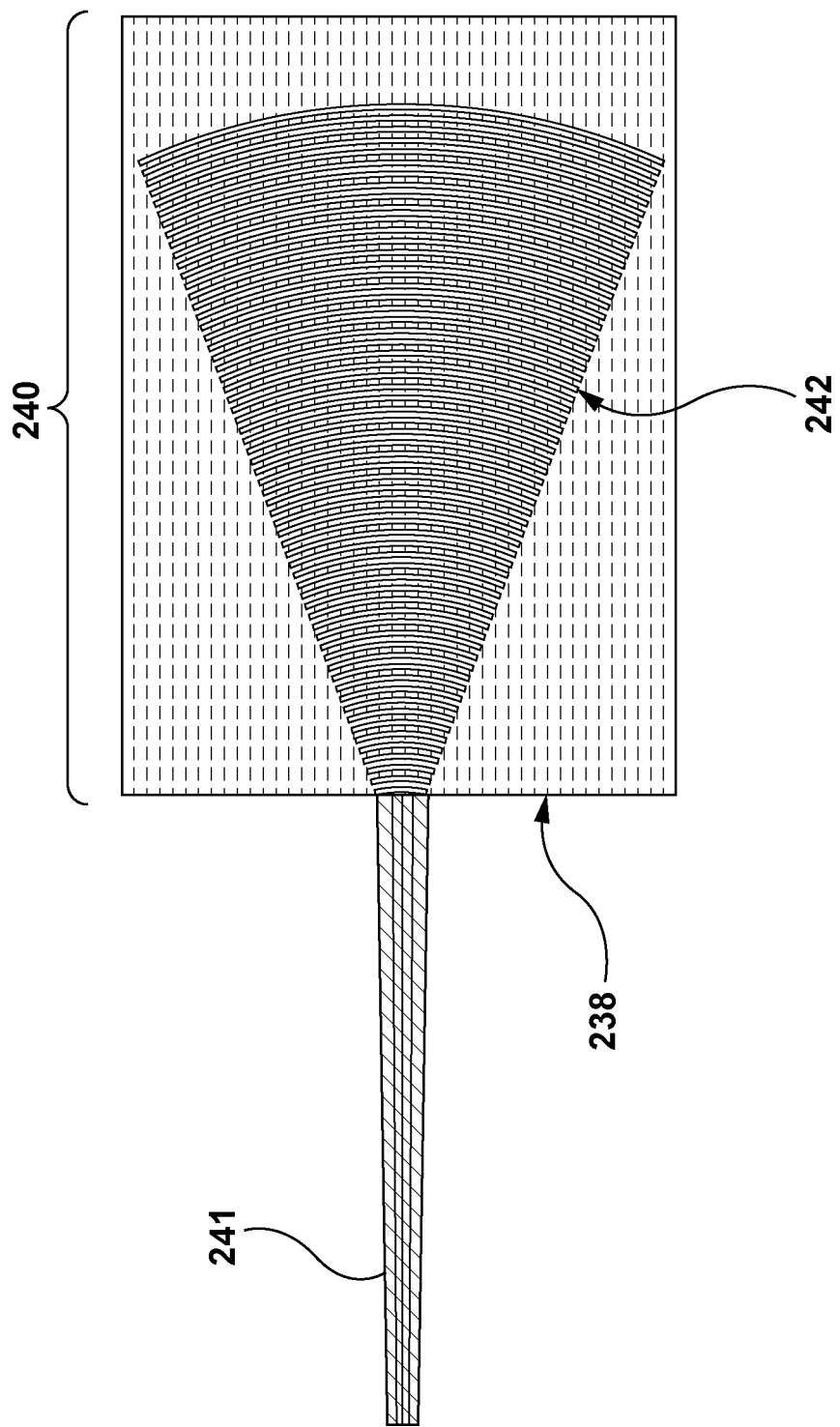
FIG. 6 is a top schematic view of a vertical Bragg grating coupler of the photonic integrated circuit chip of FIG. 3.
Figure 16:
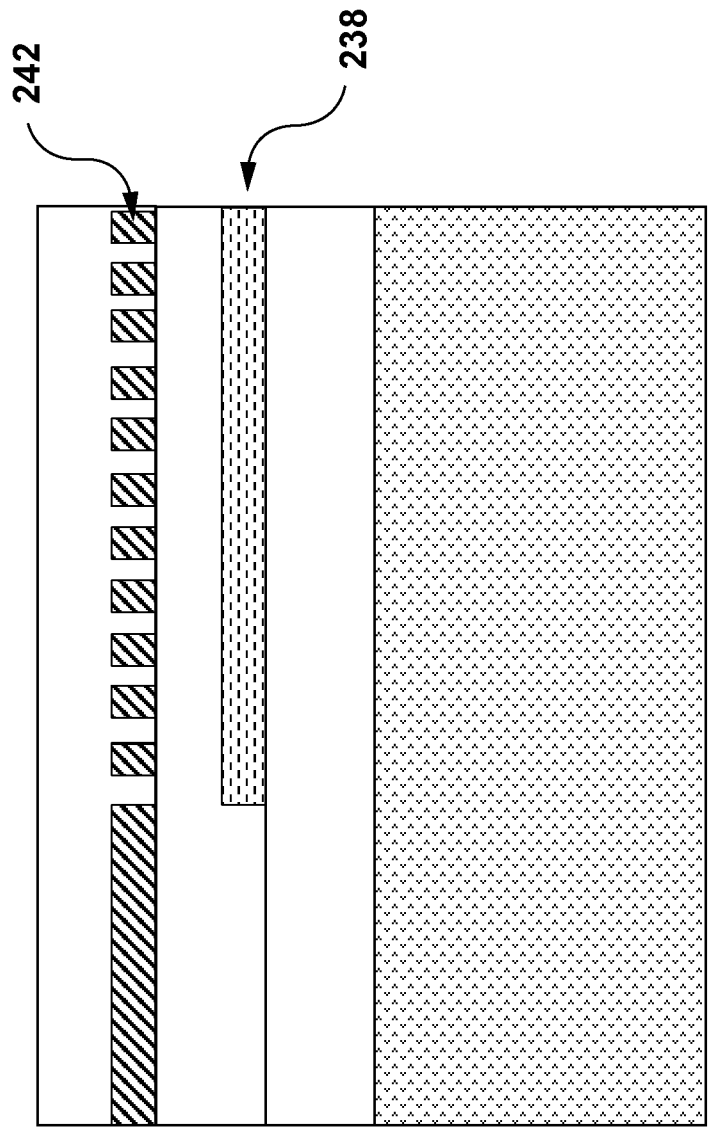
FIG. 16 is a schematic, partial, cross-sectional view of the photonic integrated circuit chip of FIG. 6.
Figure 17:
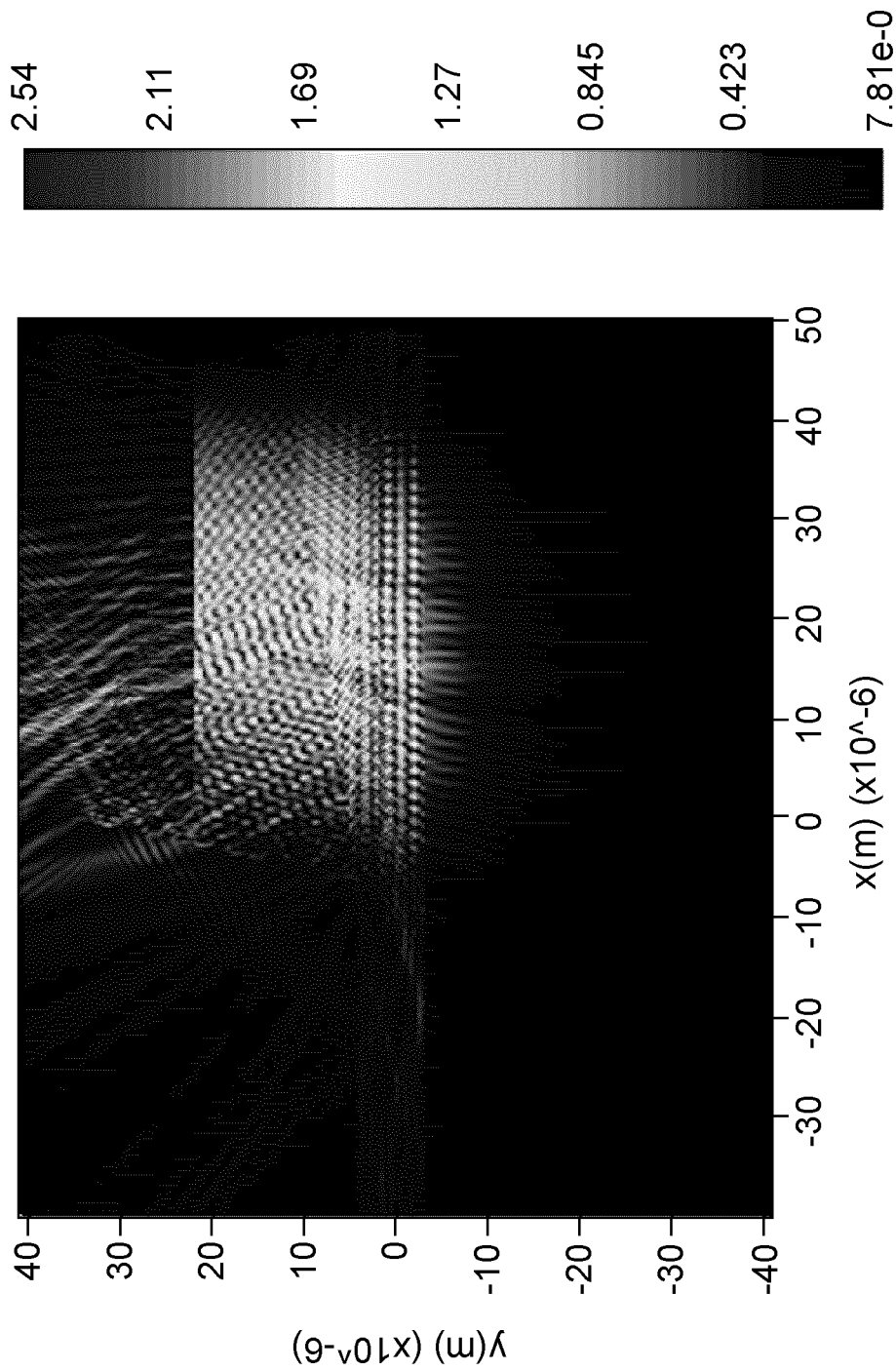
FIG. 17 is a simulation illustrating light transfer between components illustrated in FIG. 16.

The PIC chip 200 also includes three vertical Bragg grating couplers 240 optically coupled to the chip waveguide 215, illustrated in isolation in FIG. 6. Each vertical coupler 240 is formed from a reflector portion 238 (formed by the lower waveguide layer 292) and a Bragg grating 242 (formed by the upper waveguide layer 294). The cross-sectional view of the vertical coupler 240 is illustrated in FIG. 16, with a corresponding simulation of light transmission into the chip 200 being illustrated in FIG. 17. As will be described in greater detail below, the couplers 240 serve to couple light into or out of the chip waveguide 215.

In some embodiments, the couplers 240 could be formed by only one of the waveguide layers 292, 294, for example using trenches or by utilizing one or more partially-etched layers, with or without a lower reflecting layer. It is further contemplated that in some embodiments, one or more of the vertical Bragg grating couplers 240 could be replaced by "butt coupling" between the waveguide 215 and the components connected thereto. In such a case, the waveguide 215 would be abruptly ended on the edge of the PIC chip 200 and an optical connection would optically connect the waveguide 215 to the laser 260 and/or the photodetectors 282, 284. In yet other embodiments, the PIC chip 200 could alternatively, or additionally, include a tapered coupling for optically coupling between the waveguide 215 and the laser 260 and/or the photodetectors 282, 284. In some other non-limiting embodiments, active layers to form embodiments of photodetectors and/or a laser assembly could be directly deposited to the PIC chip 200 during fabrication, for example by defining the active layers through photolithography and etching.

Along the chip waveguide 215, the PIC chip 200 also includes an isolator 216 and a polarizer 218. The polarizer 218 of the present embodiment is a TE/TM mode splitter formed by the lower waveguide layer 292, including with tapered end for eliminating TM light propagation in the waveguide 215. It is contemplated that the polarizer 218 may be omitted in some embodiments. It is also contemplated that the isolator 216 and the polarizer 218 could be combined in some embodiments.

Figures 7, 8:
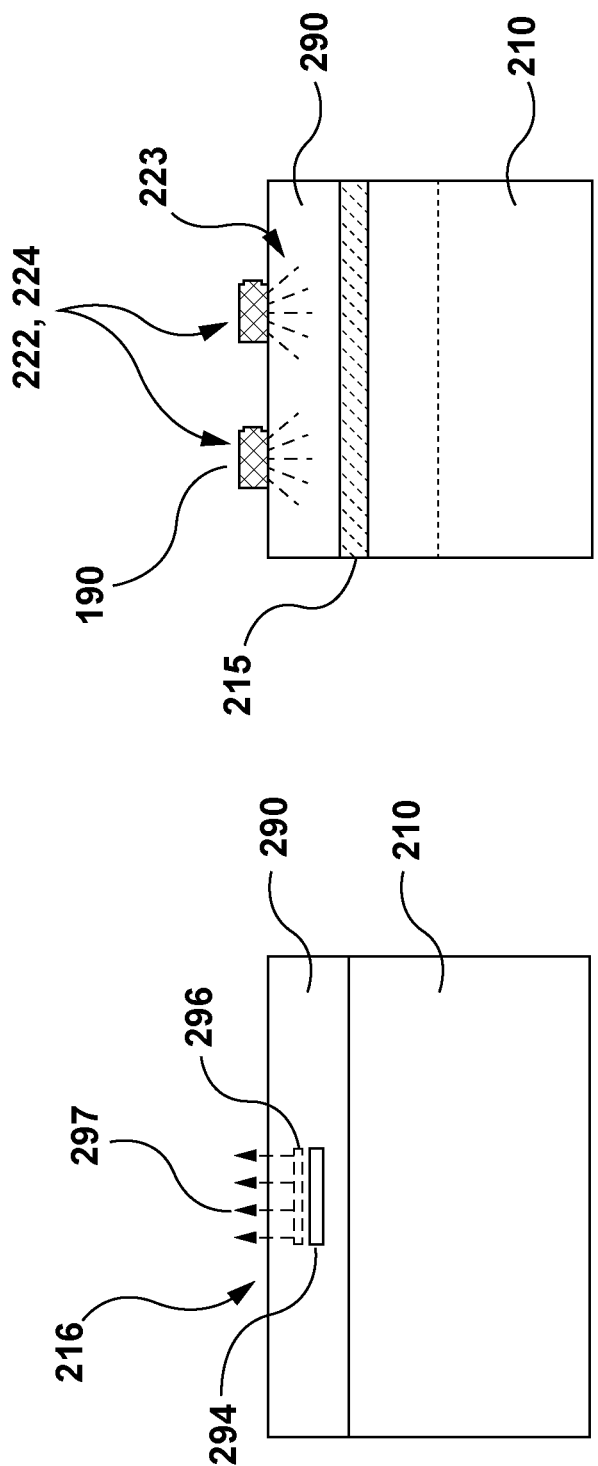
FIG. 7 is a cross-sectional schematic view of an isolator of the photonic integrated circuit chip of FIG. 3.
FIG. 8 is a cross-sectional schematic view of a phase modulator of the photonic integrated circuit chip of FIG. 3.

The PIC chip 200 further includes two optical circulators 235 for directing light from the waveguide 215 toward waveguides 241 optically connected to two of the vertical couplers 240. Functioning of the optical circulators 235 will be generally understood by the person of skill in the art. As is illustrated in FIG. 7 for the isolator 216, the circulators 235 and the isolator 216 of the present embodiment are formed by applying the magneto-optical material layer 296 across a small portion of the waveguide 215. The magneto-optic layer 296 forms a permanent magnet within the PIC chip 200, which generates a magnetic field 297 in the portion of the waveguide 215 which the layer 296 overlaps. This magnetic field 297 in the circulators 235 and the isolator 216 produces a Faraday rotation in light traveling therethrough, limiting coupling of light propagating in the undesired direction. In some embodiments, one or more of the circulators 235 and the isolator 216 could be formed by a combination the waveguide material, a magneto-optic material, and wire traces carrying electrical current. In still other embodiments, the waveguide and magneto-optic materials could be replaced by a waveguide made of magneto-optic material. It is also contemplated that the optical circulators 235 could be replaced by optical couplers.

The PIC chip 200 includes a 50:50 splitter 220 for separating light propagating through the waveguide 215 into two paths following the splitter 220. As is illustrated, the splitter 220 receives light from the waveguide 215 and sends light into a left-side portion 217 of the waveguide 215 and a right-side portion 219 of the waveguide 215. It should be noted that the left-side portion 217 and the right-side portion 219 are connected together at the bus coupler portion 214, adjacent the ring resonator 230. One of the optical circulators 235, and its corresponding waveguide portion 241, is connected to each of the left- and right-side portions 217, 219.

In the PIC chip 200, there is also included a left phase modulator 222 formed on the left-side portion 217 and a right phase modulator 224 formed on the right-side portion 219. The phase modulators 222, 224 are operatively connected to waveform generators 142, 144 on the PCB 110 for phase modulating the light signals propagating through the waveguide 215 toward the ring resonator 230.

In the present embodiment, the phase modulators 222, 224 are formed by a portion of current-carrying wire traces 190 extending along a portion of the left- and right-side portions 217, 219 of the waveguide 215. Specifically, the phase modulators 222, 224 are thermally activated phase modulators 222, 224, where the current-carrying wire traces 190 act as variable heaters. This effect is schematically illustrated in FIG. 8. The refractive index of the waveguide portions 217, 219 varies with temperature change from the variable heating (represented by the broken lines 223 in FIG. 8), in turn modulating the optical phase of light propagating through the phase modulators 222, 224. It is contemplated that various different types of phase modulators could be implemented in the present technology, depending on the specific embodiment. For instance, in some embodiments, a Pockels effect-based modulator could be implemented, where a modulation in refractive index could be controlled by an applied electric field. In such a case, LiNbO3 (lithium niobate) or BaB2O4 (barium borate) could be used as the waveguide material for example. Similarly, in some embodiments, a piezoelectric effect-based phase modulator could be implemented where a piezoelectric material induces pressure waves in the waveguide material to modulate the refractive index (through compression and expansion of the waveguide material) which in turn creates the phase shift modulation. It is further contemplated that the PIC chip 200 could include one or more semiconductor phase modulator, which modulates refractive index variation through electromagnetic wave induced electrical carrier concentration variation.

Figure 9:
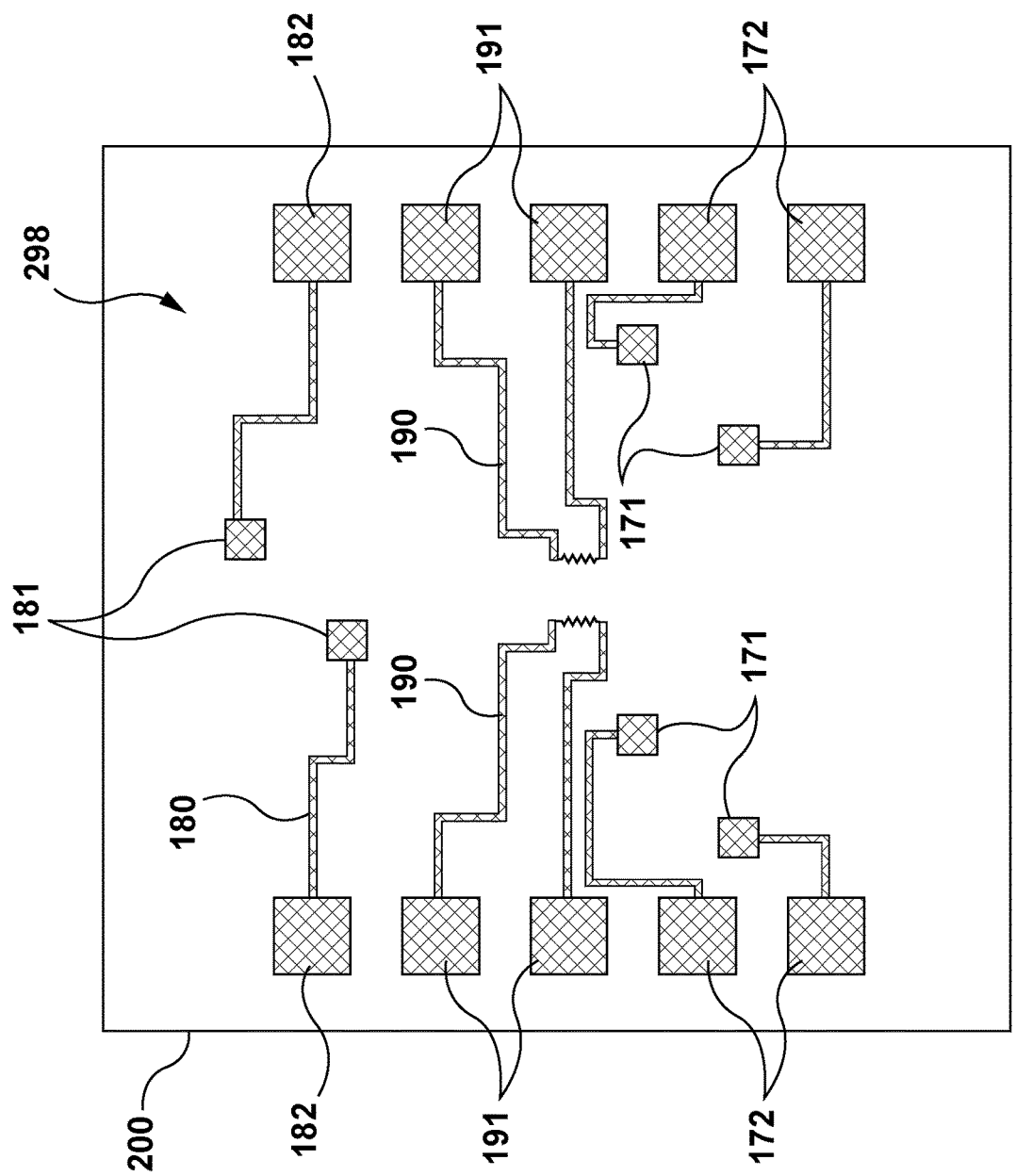
FIG. 9 is a top schematic view of a metal layer of the photonic integrated circuit chip of FIG. 3.

With additional reference to FIG. 9, the PIC chip 200 further includes a plurality of electrical connection elements disposed on a top surface of the dielectric layer 290. Specifically, the electrical connection elements are formed by the previously mentioned metallic layer 298, which is deposited onto the dielectric layer 290 by physical vapor deposition. It is also contemplated that the metallic layer 298 could be deposited using metal evaporation, chemical vapor deposition, or electroplating.

The electrical connection elements include the two current-carrying wire traces 190 which form the phase modulators 222, 224 (in conjunction with the waveguide 215). Each of the traces 190 is electrically connected to two connection pads 191, which are arranged to be connected to a corresponding waveform generator 142, 144 (described in more detail below).

The electrical connection elements also include two laser electrical routing elements 180, which provide electrical and communicative connection between the laser assembly 260 and the PCB card 110 (described further below). Each of the elements 180 includes a bond pad 181 for flip chip bonding the laser assembly 260 to the PIC chip 200 and a pad 182 for wire bonding the PCB 110 to the element 180. In some embodiments, the laser assembly 260 could require four electrical contacts.

The electrical connection elements further include four detector electrical routing elements 170, two elements 170 for each of the two photodetectors 282, 284. The elements 170 provide electrical and communicative connection between the photodetectors 282, 284 and the PCB card 110 (described further below). Each of the elements 170 includes a bond pad 171 for flip chip bonding a corresponding one of the photodetectors 282, 284 to the PIC chip 200 and a pad 172 for wire bonding the PCB 110 to the element 170.

As is mentioned briefly above, the gyroscope 100 includes the tunable laser assembly 260, also referred to as the laser assembly 260 or laser 260, operatively connected to the top surface of the PIC chip 200. In the present embodiment, a tunable vertical-cavity surface-emitter laser (VCSEL) 260 is operatively and optically connected to the PIC chip 200. In some embodiments, an edge-emitting solid-state laser could be used. In such a case, the edge-emitting laser would be optically connected to the PIC chip 200 using an aligned waveguide to couple to the chip waveguide 215. In some embodiments, it is also contemplated that a laser assembly, or portions of a laser assembly, could be incorporated into the PIC chip 200.

Figure 18:
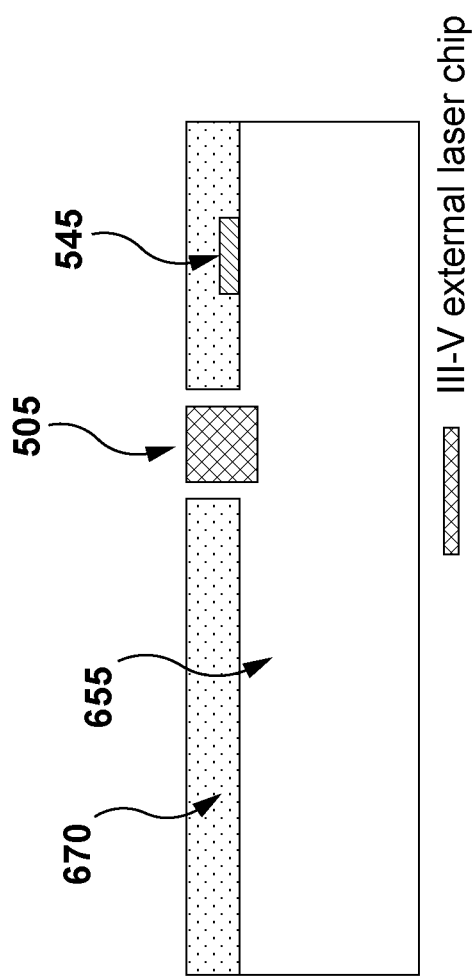
FIG. 18 is a schematic, cross-sectional view of a portion of another non-limiting embodiment of a III-V laser chip placed into the PIC.
Figure 19:
FIG. 19 is a schematic side view of another possible filter (Fabry-Perot) for use with the portions of the photonic integrated circuit chip of FIG. 18.
Figure 20:
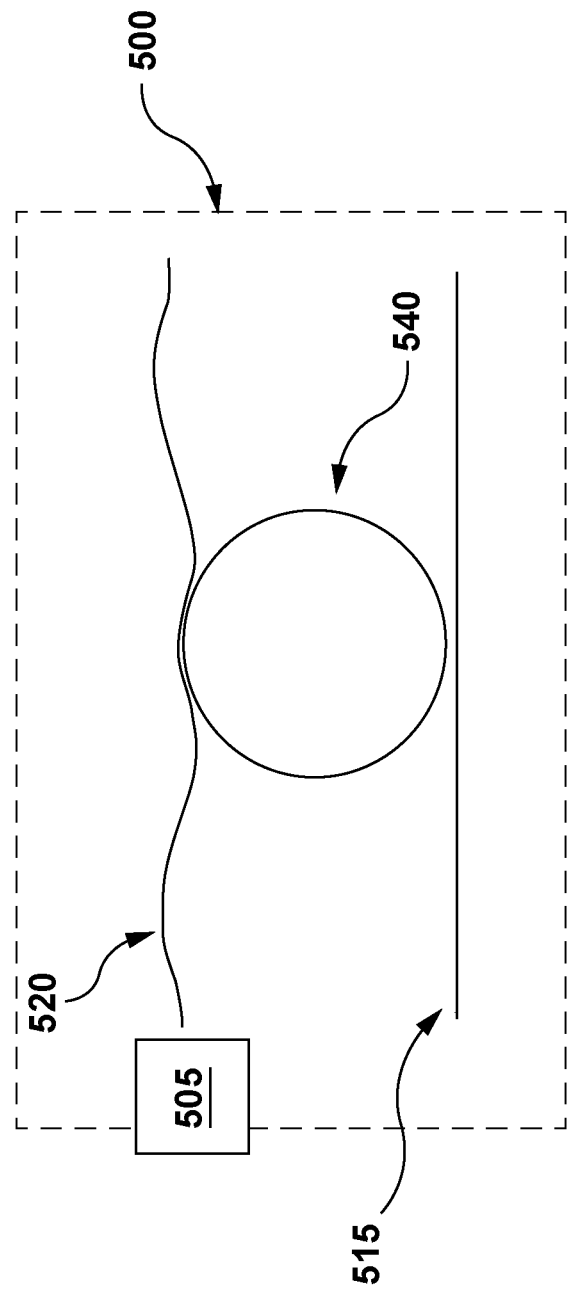
FIG. 20 is top schematic view of the photonic integrated circuit chip portions of FIG. 18 showing a ring-based filter.

With reference to FIGS. 18 to 20, some embodiments could implement an edge-emitting laser or laser chip such as a Distributed Feedback Laser (DFB) 505 that is incorporated into the chip 200 and passively aligned with at least one filter element. In the illustrated embodiment, the integrated laser chip 505 is disposed in a recess formed in dielectric material and partially in a substrate (described further below). Such a filter could be a ring resonator filter 540 (see FIG. 20) or a Fabry-Perot (FP) filter 545 (see FIG. 19). In the non-limiting embodiment of the ring filter 540 shown in FIG. 20, the chip 200 could include a bus waveguide 520 that couples the light received from the laser chip 505 into the filter ring 540. In other non-limiting embodiments, the chip 200 further include a secondary waveguide and bus coupler 515 arranged to optically couple to the filter ring 540 and receive filtered light therefrom. While III-V laser chips such as DFB lasers are commercially available, they are generally broadband lasers. The filter elements 540, 545 are therefore incorporated in at least some embodiments to narrow the linewidth of light prior to coupling to the ring resonator 230, as described above. To this end, the filter element 540, 545 is generally configured to select a narrow wavelength band of the broadband illumination from the laser chip 505, and optically couple the narrow wavelength band of illumination to a corresponding waveguide.

In at least some embodiments, the FP filter 545 could include two Bragg mirrors, such as those described in U.S. Pat. No. 10,126,321, issued Nov. 13, 2018, the entirety of which is incorporated herein by reference. In the illustrated embodiments, the Bragg mirrors would generally be formed of silicon nitride and disposed in the layer 215. The number of slots forming Bragg mirror on each end should generally be chosen to create a reflector with >90% reflectivity.

Figure 5:
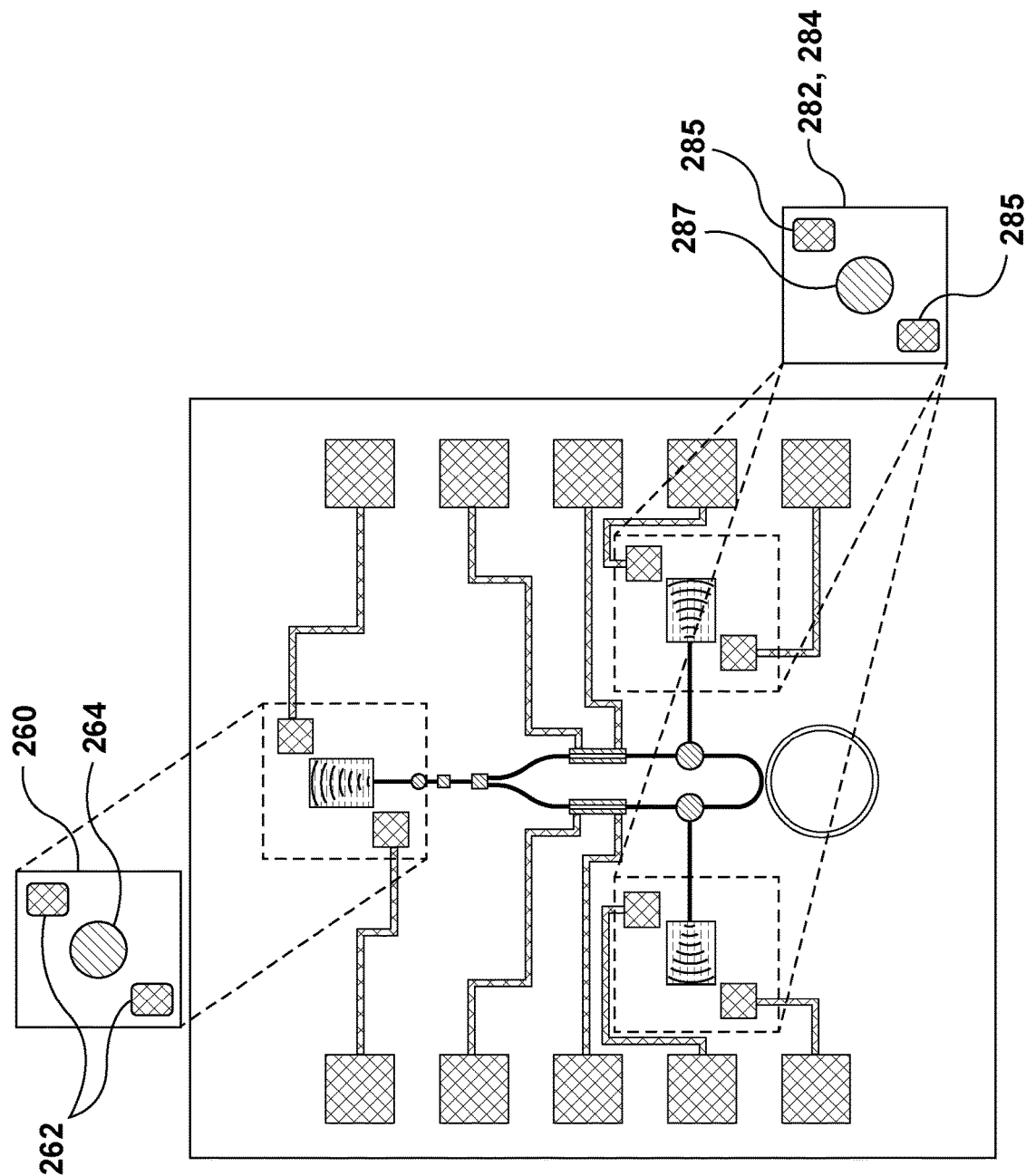
FIG. 5 is a top plan view schematic diagram of the photonic integrated circuit chip of FIG. 3, with portions of electronic connections illustrated.

As is illustrated in FIGS. 1 and 5, the laser 260 is electrically and optically connected to the PIC chip 200. The laser 260 is electrically connected to the PIC chip 200, to receive electricity and electronic signals therefrom via using flip-chip bonding techniques. The laser assembly 260 includes two electrodes 262 (see FIG. 5) which are aligned with and disposed on the bond pads 181 on the top surface of the PIC chip 200. The laser 260 is further aligned on the PIC chip 200 such that a laser active zone 264, also referred to as an emitting zone 264, is aligned with the vertical Bragg grating coupler 240. In this way, light emitted by the laser 260 is coupled, by the vertical Bragg grating coupler 240, into the chip waveguide 215. In some embodiments, the laser assembly 260 could include four electrical connections: two connections to supply power and two connection to manage laser cavity temperature for wavelength tuning.

The gyroscope 100 also includes the two photodetector assemblies 282, 284, specifically a left-side photodetector assembly 282 and a right-side photodetector assembly 284 operatively connected to a top surface of the PIC chip 200. In the present embodiment, the photodetector assemblies 282, 284, also referred to as the photodetectors 282, 284 are surface window photodetectors optically connected to the PIC chip 200. It is contemplated that in some embodiments, the photodetector assemblies 282, 284 could be integrated directly into the PIC chip 200, portions of which would be formed during fabrication of the PIC chip 200. In such cases, the photodetectors could be formed at least in part from SiGe, Ge, or materials from the III-V or II-VI compounds.

Similarly to the laser 260, each of the photodetector assemblies 282, 284 are flip-chip bonded to the PIC chip 200. Specifically, two electrodes 285 of each of the photodetector assemblies 282, 284 are flip-chip bonded to corresponding bond pads 171 of the chip 200. A photodetector active area 287, also referred to as a receiving zone 287, of each photodetector assembly 282, 284 is aligned to a corresponding one of the vertical Bragg grating couplers 240. In this way, light received at the vertical Bragg grating couplers 240 from the circulators 235 is coupled out of the waveguide portion 241 and into the corresponding photodetector assembly 282, 284.

Figure 10:
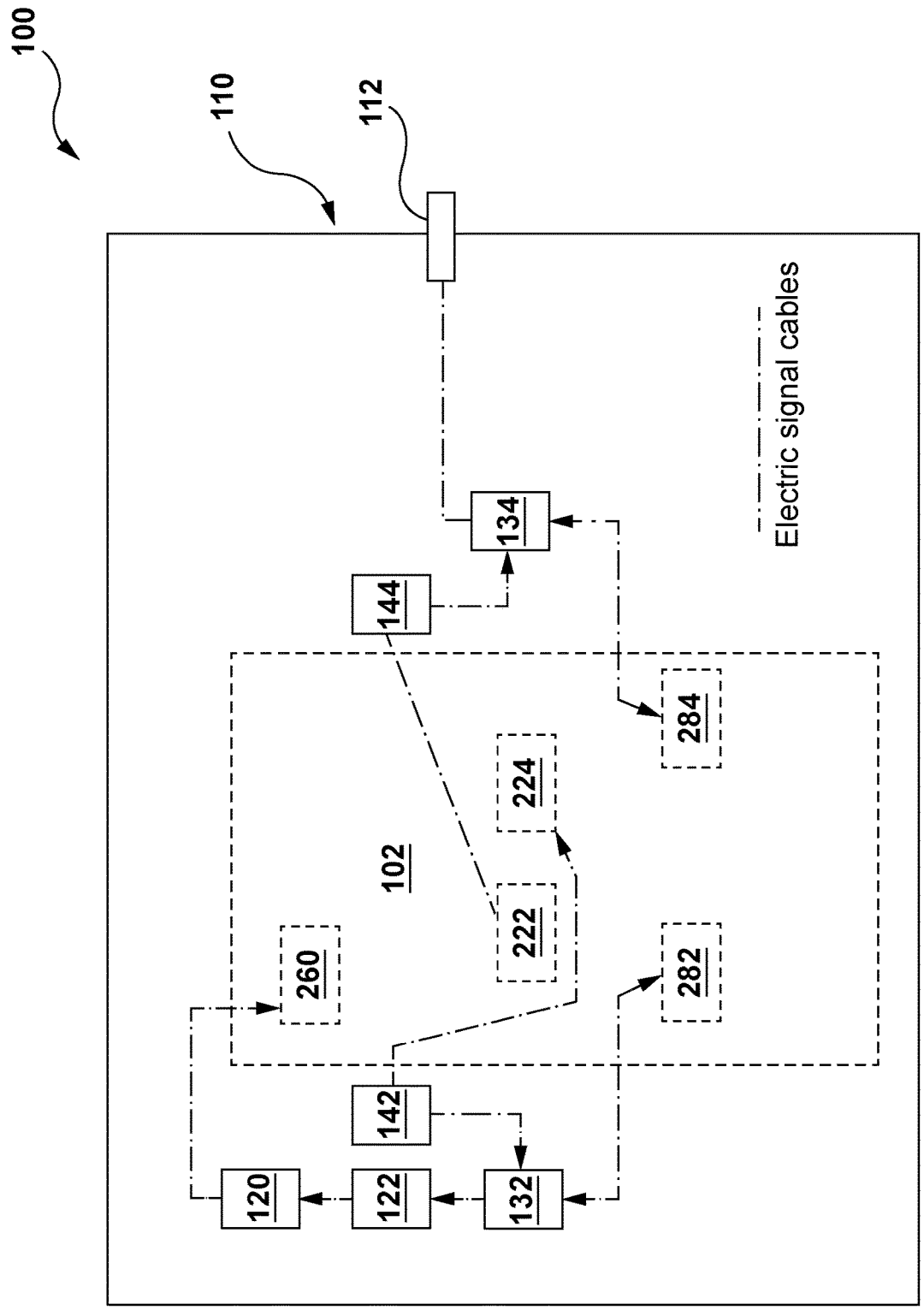
FIG. 10 is a top schematic view of a printed circuit board of the gyroscope of FIG. 100.

Returning to FIGS. 1 and 2 and with additional reference to FIG. 10, the printed circuit board (PCB) 110 is illustrated in more detail. The PCB 110 is formed from standard circuit board and supports a plurality of electronic components for controlling and/or operating the gyroscope 100. In some embodiments, the PCB 110 could be replaced by a ceramic substrate and electric assembly. Depending on the embodiment, the PCB 110 could include additional components not mentioned herein, including but not limited to: GPS system electronics and computer interfacing components.

The PCB 110 defines a chip receiving area 102 arranged and configured to receive the PIC chip 200. During fabrication of the gyroscope 100, a bottom surface of the chip 200 (opposite the surface having the metallic layer 298) is glued to the chip receiving area 102 in order to immovably fix the chip 200 and the PCB 110 together. In some embodiments, the chip 200 and the PCB 110 could be connected by different methods, including but not limited to eutectic bonding and solder bump bonding. Elements of the chip 200 to which the electronic components connect (the laser 260, the photodetectors 282, 284, and the phase modulators 222, 224) are illustrated schematically in FIG. 10 for ease of reference. The PCB 110 further includes ten electrical connection pads 114 (see FIG. 2) for operatively connecting the PIC chip 200 to the PCB 110. The exact number of electrical connection pads 114 could vary depending on the embodiment. The connection pads 114 are wire-bonded to the pads 172, 182, 191 of the chip 200 in the present embodiment, but different methods of electrically connecting the chip 200 and the PCB 110 are contemplated.

The PCB 110 includes a communication port 112 through which the gyroscope 100 receives power (electricity) and communicates information (both receiving and providing of information). The port 112 is in the form of an ethernet connection in the present embodiment, but a variety of different connection modalities are contemplated. The PCB 110 could receive power from and/or communicate through (as applicable) components including, but not limited to: RS232 and USB data connections.

The PCB 110 also includes a waveform generator 142 for controlling the phase modulator 224 and a waveform generator 144 for controlling the phase modulator 222. Specifically, each waveform generator 142, 144 is connected to corresponding connection pads 191 for modulating the current passing through the electric traces 190.

The PCB 110 further includes two lock-in amplifier modules 132, 134 for performing signal detection in the gyroscope 100. Each lock-in amplifier module 132, 134 is communicatively connected to a corresponding one of the waveform generators 142, 144 and a corresponding one of the photodetectors 282, 284.

The PCB 110 includes a controller 120 and a processor 122 for providing computer-implemented processes for the gyroscope 100. The controller 120 of the present embodiment is a proportional integral derivative (PID) controller 120. The processor 122 is specifically a micro-processor 122 in the present embodiment. The controller 120 and/or the processor 122 are communicatively connected (either directly or indirectly) to the lock-in amplifier module 132, the waveform generator 142, the laser assembly 260, and the photodetector 282. The tasks managed by the controller 120 and the processor 122 include, but are not limited to: managing the laser assembly 260, receiving and treating data from the processor 122, managing the waveform generators 142, managing the parameters of the lock-in amplifiers 132, 134, managing gain for the photodetectors 282, 284, and collecting and manipulating data into a readable format for outward transmission through the communication port 112. It is contemplated that the controller 120 and the processor 122 could be integrally connected in some embodiments.

Having set out the components of the optical ring resonator-based gyroscope 100 above, the general function and operation is here set out briefly in continued reference to FIGS. 1 and 10. It is noted that some steps and operations, well known to the person skilled in the art, may be omitted herein for clarity.

The tunable laser assembly 260, as instructed by the controller 120, produces light. Via the vertical Bragg grating coupler 240, the emitted light is coupled into the waveguide 215. The waveguide 215 then conducts the light through the optical isolator 216 to prevent back reflection of light from the waveguide 215 or other optical elements, to avoid impact on the stability of the laser assembly 260. The waveguide 215 then conducts the light through the polarizer 218 to allow only one polarization (also referred to as the mode) to propagate further in the optical circuit of the chip 200.

Light then reaches the optical splitter 220 to split the optical signal in a 50:50 ratio, with half of the light passing into each one of the left- and right-side waveguide portions 217, 219. In each of the left- and right-side waveguide portions 217, 219, the light encounters the corresponding optical phase modulator 222, 224 to modulate the phase of the light. Each modulated light portion then passes through the corresponding circulator 235 to reach the bus coupler portion 214 together (i.e. simultaneously). The bus coupler portion 214 is configured and arranged to have a coupling ratio which allows some light to couple into the ring resonator 230; the same ratio of each modulated light portion leaks into the ring resonator 230. A clockwise (CW) and a counterclockwise (CCW) signal, produced by the two modulated light portions, then resonate at the same time in the ring 230. Light signals that subsequently leak back out of the ring 230 and couple back into the bus coupler portion 214 then propagate to one of the circulators 235. From the circulators 235, light then propagates through the waveguide portion 241 and are coupled by the corresponding vertical Bragg grating coupler 240 into the corresponding photodetector assembly 282, 284.

For the CCW signal, the wave form generator 142 controls the phase modulator 224 with a pre-determined electrical wavefunction to be converted in phase modulation. Light travelling CCW in the ring 230 is collected by the photodetector 282, connected to the lock-in amplifier module 132. The module 132 then extracts and communicates the signal intensity and phase to the processor 122. The processor 122 then determines if the laser frequency produced by the laser 260 matches the resonant frequency of the ring 230. In response to determining that the resonance frequency of the ring 230 has not been matched by the laser 260, the PID controller 120 instructs the laser 260 to vary the frequency to better match the resonant frequency of the ring 230. This process may continue iteratively until the laser 260 emission frequency is matched to the resonant frequency of the ring 230. When the frequency has been matched, it is referred to as "locking" the laser 260 to the resonance mode of the ring 230.

In a similar process, for the clockwise (CW) signal, the wave form generator 144 controls the phase modulator 222 with a pre-determined electrical wavefunction to be converted in phase modulation. Light travelling CW in the ring 230 is collected by the photodetector 284, connected to the lock-in amplifier module 134. For this signal portion, however, any "error" or deviation from the resonant frequency of the ring 230, when the laser 260 is locked on the resonance, detected by the lock-in amplifier module 134 is sent as a gyroscope output signal through the communication port 112. The error signal is proportional to an optical path difference between the CW and CCW optical signals due to the Sagnac Effect, induced by and directly proportional to the rotational speed of the gyroscope 100. When there is no rotation of the gyroscope 100, the CW and CCW light signals in the ring 230 sees the same resonance frequency and there is no phase shift between the two; the gyroscope output signal is thus zero. When there is a rotational speed, there is a phase shift induced between CW and CCW signal; the gyroscope output signal is thus non-zero and the real angular velocity of the gyroscope 100 can be extracted. Specifically, while the laser 260 is locked to the ring resonant frequency, the error in the clockwise signal (in the present embodiment) is directly proportional to the angular velocity of the gyroscope 100.

Figure 11:
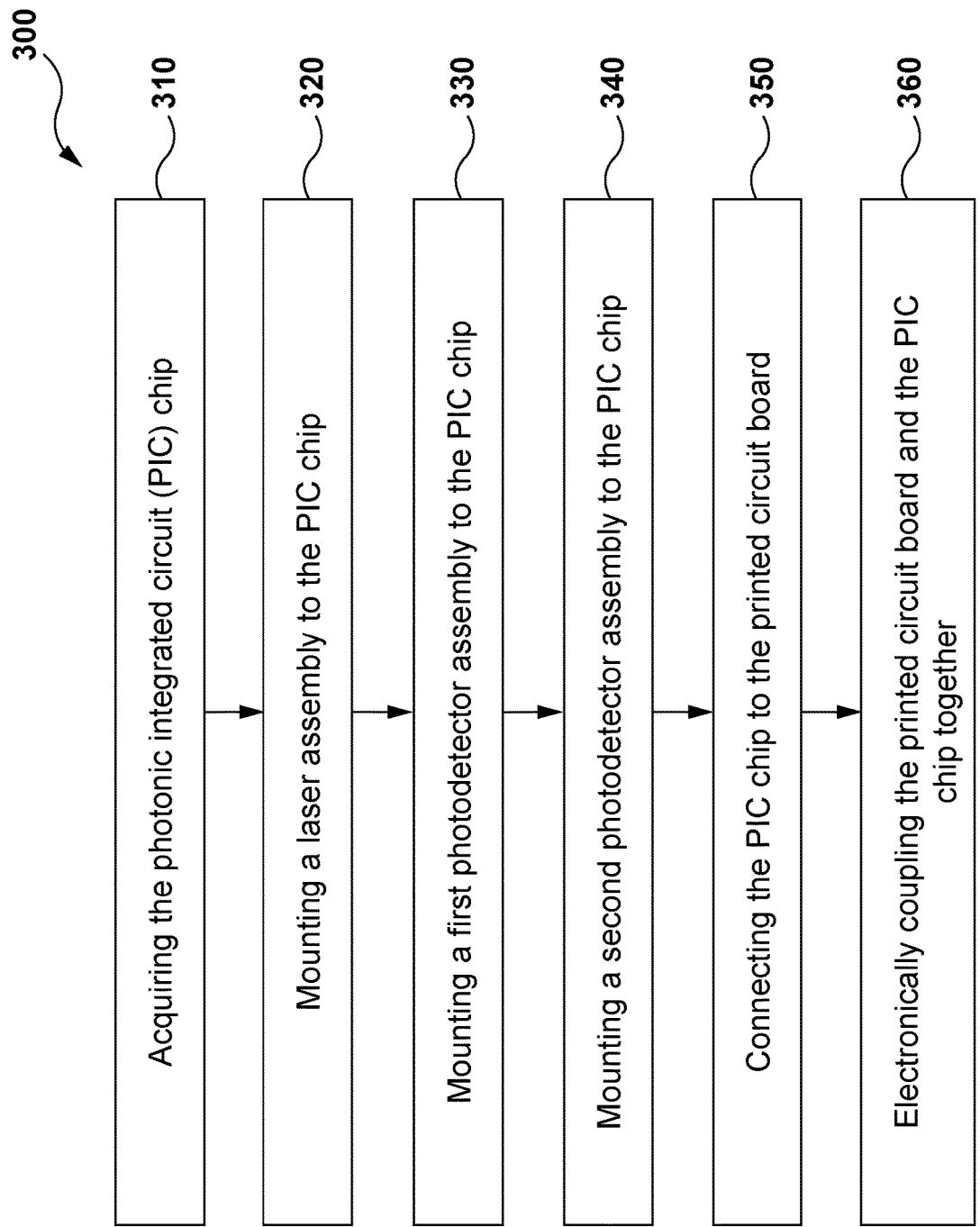
FIG. 11 is a flowchart illustrating a non-limiting embodiment of a method of fabricating the gyroscope of FIG. 1.

With reference to FIG. 11, a method 300 of assembling the optical ring resonator-based gyroscope 100 will be described.

The method 300 begins, at step 310, with acquiring the photonic integrated circuit (PIC) chip 200. Acquiring the PIC chip 200 could include fabricating the chip 200, retrieving the chip 200 having been previously fabricated, or receiving the chip 200 from a third party. Fabricating the PIC chip 200, according to at least some non-limiting embodiments, is described below in more detail with reference to method 400. In some embodiments, acquiring the chip 200 could further include preparing the chip 200 for subsequent steps of the method 300.

The method 300 continues, at step 320, with mounting the laser assembly 260 to the PIC chip 200, where the laser assembly 260 is electrically and communicatively connected to the PIC chip 200 by the electrical contacts 262. In the present embodiment, mounting the laser assembly 260 to the PIC chip 200 includes aligning the emitting zone 264 with the corresponding one of the vertical Bragg grating couplers 240, in order to optically algin the laser assembly 260 with the optical elements of the PIC chip 200. The laser assembly 260 is mounted to the PIC chip 200 using a flip-chip bonding method, although this could vary in different embodiments. In embodiments including the laser chip 505, mounting a laser assembly to the PIC chip 200 could further include aligning an emitting zone of the III-V laser chip 505 with a filter element configured to narrow a linewidth of the III-V laser chip 505 and send narrow-bandwidth light into the PIC chip 200, such as the filter ring 540 and/or the FP filter 545.

The method 300 continues, at step 330, with mounting the photodetector assembly 282 to the PIC chip 200 by the corresponding electrical contacts 285. The method 300 continues, at step 340, with mounting the photodetector assembly 284 to the PIC chip 200 by corresponding electrical contacts 285.

In the present embodiment, mounting the photodetector assembly 282 to the PIC chip includes coupling the photodetector assembly 282 to the contacts 171 by a flip-chip bonding method and mounting the photodetector assembly 284 to the PIC chip includes coupling the photodetector assembly 284 to the other contacts 171 by a flip-chip bonding method. It is contemplated that the photodetector assemblies 282, 284 could be connected to the PIC chip 200 in different manners, depending on the embodiment. Mounting the photodetector assemblies 282, 284 further includes the receiving zone 287 of each photodetector assembly 282, 284 with the corresponding vertical Bragg grating coupler 240 in the PIC chip 200 in order to optically algin the photodetector assembly 282, 284 with the optical elements of the PIC chip 200.

The method 300 continues, at step 350, with connecting the PIC chip 200 to the printed circuit board 110. As is mentioned briefly above, the bottom surface of the PIC chip 200 is glued to a top surface of the PCB 110, specifically in the chip receiving zone 102 of the PCB 110. It is also contemplated that the PIC chip 200 and the PCB 110 could be connected together by other methods.

The method 300 continues, at step 360, with electrically coupling the PCB 110 and the PIC chip 200 together via electrical contacts of the PIC chip 200. The PCB 110 and the PIC chip 200 are wire bonded together using the contact pads 172, 182, and 191 of the chip 200 and the plurality of pads 114 on the PCB 110.

It should be noted that the order of the steps 320, 330, 340, and 350 could vary, depending on the particular implementation of the method 300. It is also contemplated that additional and/or alternative steps could be implemented.

Figure 12:
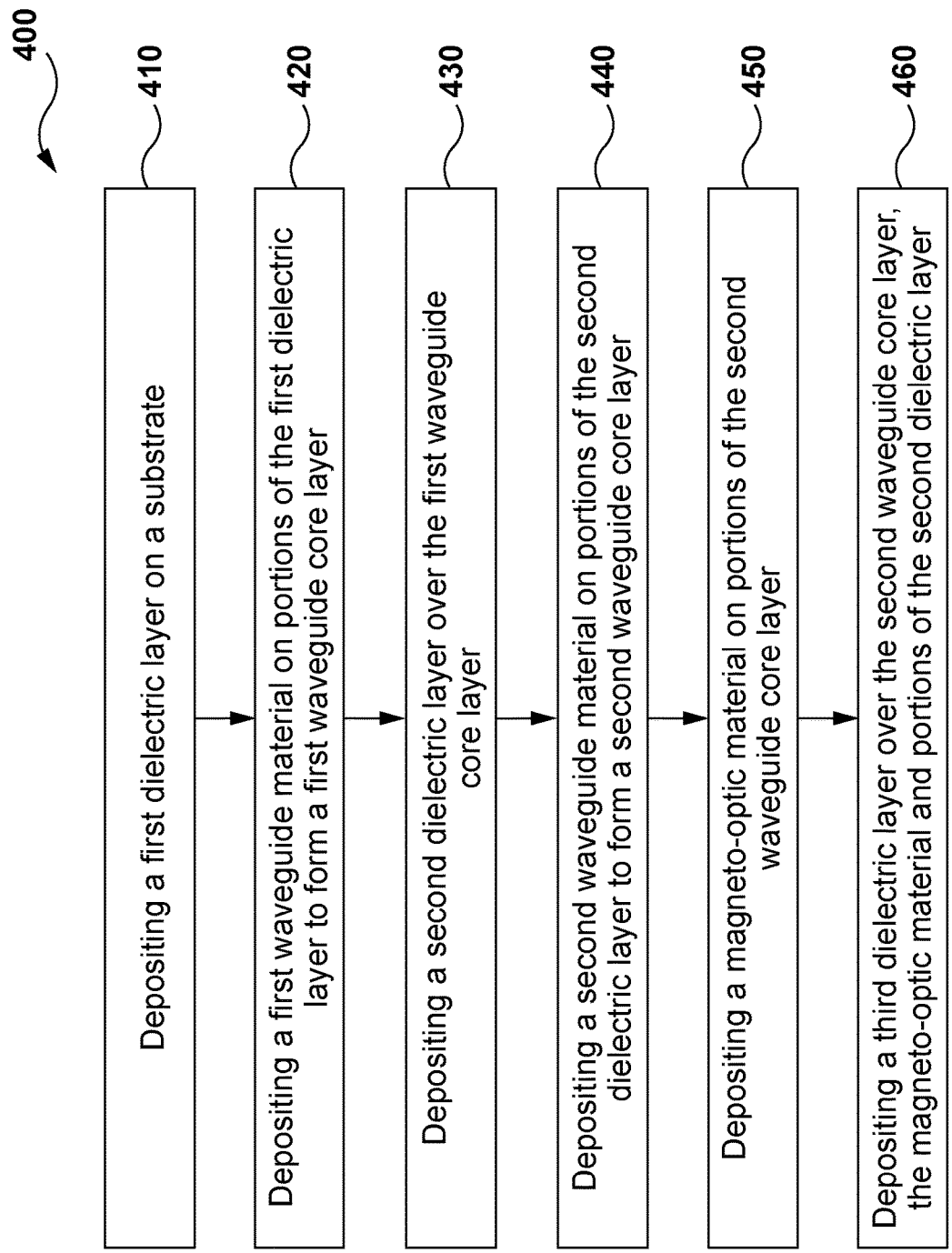
FIG. 12 is a flowchart illustrating a non-limiting embodiment of a method of fabricating the photonic integrated circuit chip of FIG. 3.

With reference to FIG. 12, a method 400 of fabricating the photonic integrated circuit (PIC) chip 200 will be described. While the steps of the method 400 describe "deposition" of different layers, it should be noted that the exact method of deposition could vary, and will be well known to a person of skill in the art. In the following steps, it is contemplated that methods of deposition that could be implemented include, but are not limited to: spin-coating, photo-resist development and etching, electron-beam lithography, thermal oxidation, plasma etching, low pressure chemical vapor deposition, plasma enhanced chemical vapor deposition, and physical vapor deposition.

The method 400 begins, at step 410, with depositing a first dielectric layer on the substrate 210 (a portion of the dielectric layer 290) to form a bottom waveguide cladding. In the present embodiment, thermal oxide (silicon dioxide, $SiO_2$) is grown on the silicon substrate 210 in order to generate the bottom cladding.

The method 400 continues, at step 420, with depositing waveguide material on portions of the first dielectric layer to form a first waveguide core layer, specifically the lower waveguide layer 292. In the present embodiment, silicon nitride is deposited through low pressure chemical vapor deposition on the thermal oxide bottom cladding. The silicon nitride is then processed by photolithography and plasma etching to form the lower waveguide layer 292, the photoresist then being stripped to remove extraneous material. It is contemplated that different materials could be used.

The method 400 continues, at step 430, depositing a second dielectric layer over the lower waveguide layer 292 and portions of the first dielectric layer, the second dielectric layer forming a first top cladding for the first waveguide core layer. In the present embodiment, silicon dioxide ($SiO_2$) is deposited, but it is contemplated that different materials could be used.

The method 400 continues, at step 440, depositing a second waveguide material on portions of the second dielectric layer to form a second waveguide core layer, specifically the upper waveguide layer 294. In the present embodiment, the upper waveguide layer forms the Bragg gratings 242 and the chip waveguide 215. Silicon nitride is used for the upper waveguide layer 294 in the present embodiment. Once again, the silicon nitride is processed by photolithography and plasma etching to form the lower waveguide layer 292, the photoresist then being stripped to remove extraneous material. It is contemplated that different materials could be used.

The method 400 continues, at step 450, depositing a magneto-optic material on portions of the second waveguide core layer, forming the magneto-optic layer 296 and forming therewith the circulators 235 and the isolator 216. Different materials could be used for the magneto-optic layer 296, including but not limited to: terbium gallium garnet (Tb3Ga5O12), yttrium iron garnet (Y3Fe5O12), bismuth substituted iron garnets (Bi3Fe5O12), and yttrium iron garnets (YIG) substituted with cerium (Ce1Y2Fe5O12) or bismuth (Bi1Y2Fe5O12). The magneto-optic layer 296 could be deposited by laser ablation deposition or wafer bonding.

The method 400 continues, at step 450, depositing a third dielectric layer over the upper waveguide layer 294, magneto-optical layer 296, and portions of the second dielectric layer, the third dielectric layer forming a second top cladding layer for the second waveguide core layer. In the present embodiment, silicon dioxide ($SiO_2$) is deposited, but it is contemplated that different materials could be used.

In some embodiments, the method 400 further includes depositing a metal layer 298 on portions of the dielectric layer 290. As is described above, the metal layer 290 forms the plurality of electrical connection pads 172, 182, 191 which are configured and arranged for receiving electrical connections from the PCB 110 and connection pads 171, 181 for flip-chip bonding the laser assembly 260 and the photodetector assemblies 282, 284 thereto.

In some embodiments, the method 400 could further include bonding the III-V laser chip 505 into the chip 200, subsequent to depositing one of the first dielectric layer and the second dielectric layer. In some cases, the method 400 could also include forming at least one filter element in one of the first waveguide core later and the second waveguide core layer.

It is contemplated that the method 400 could include additional or different steps, either to perform additional functions and/or to perform the steps described above.

Figure 21:
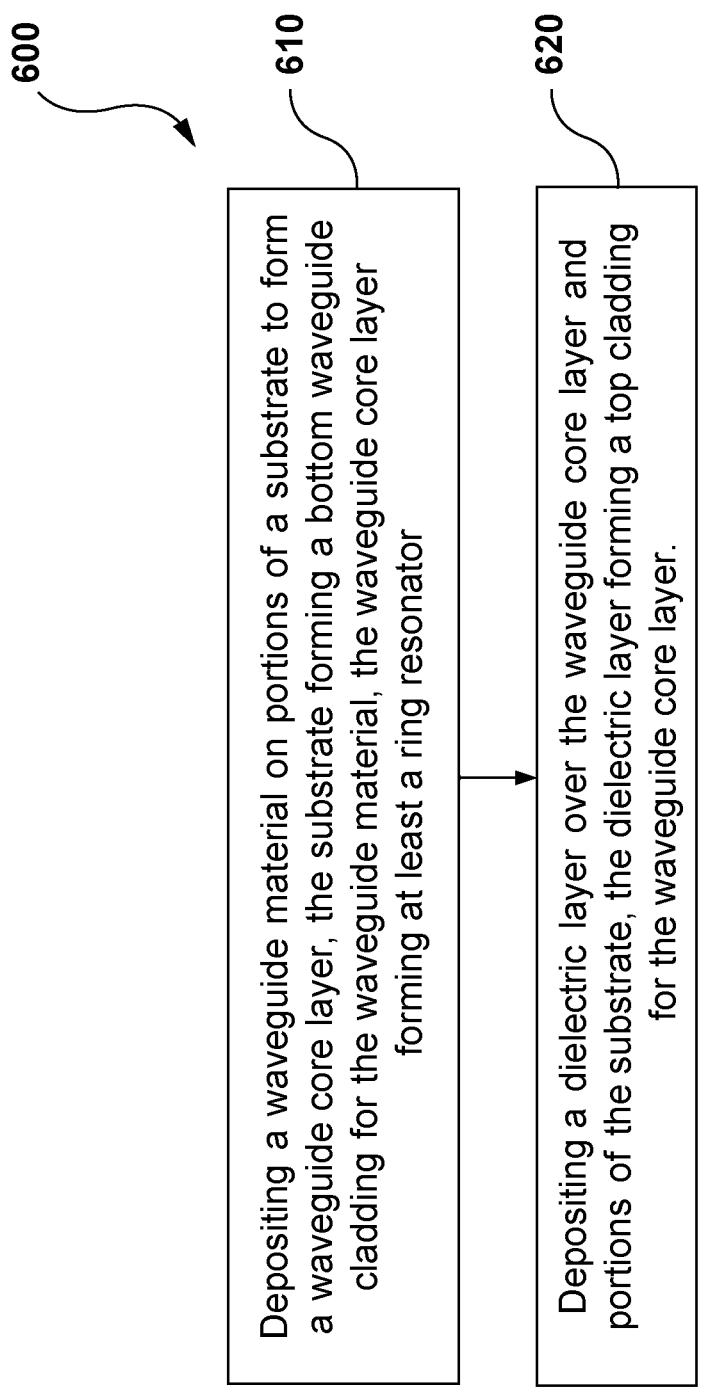
FIG. 21 is a flowchart illustrating a non-limiting embodiment of a method of fabricating the photonic integrated circuit chip of FIG. 22.

With reference to FIG. 21, another non-limiting method 600 of fabricating the photonic integrated circuit (PIC) chip 200 will be described. Similarly to the method 400, the exact method of deposition could vary for the steps in the method 600 describing "deposition" of different layers, which will be well known to a person of skill in the art. In the following steps, it is contemplated that methods of deposition that could be implemented include, but are not limited to: spin-coating, photo-resist development and etching, Deep Ultra Violet (Deep UV) lithography, electron-beam lithography, thermal oxidation, plasma etching, low pressure chemical vapor deposition, plasma enhanced chemical vapor deposition, and physical vapor deposition.

The method 600 begins, at step 610, with depositing waveguide material on portions of another non-limiting embodiment of the substrate 210, specifically a glass wafer substrate 650. Depending on the particular implementation, the substrate 650 could be formed from different glass materials including, but not limited to, fused silica, quartz, and borosilicate. The waveguide material is deposited directly on the substrate 650 to form a first waveguide core layer, specifically the lower waveguide layer 292 (see FIGS. 22 and 23). In the present embodiment, silicon nitride is deposited through low pressure chemical vapor deposition on the substrate 650. The silicon nitride then undergoes a chemical-mechanical polishing (CMP) process to smooth its top surface. The silicon nitride is then processed by photolithography and plasma etching to form the lower waveguide layer 292, the photoresist then being stripped to remove extraneous material. It is contemplated that different materials could be used.

Figure 23:
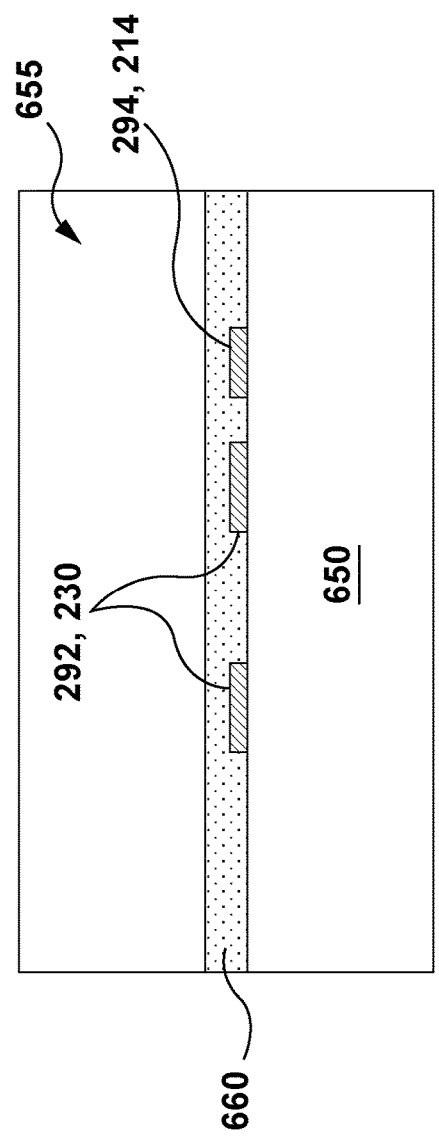
FIG. 23 is a schematic, cross-sectional view of another non-limiting embodiment of a photonic integrated circuit chip.

The waveguide layer 292 forms at least the ring resonator 230, as well as some of the waveguide elements as described with reference to the chip 200. In some embodiments, the waveguide layer 292, deposited on the substrate 650, could also form the optical bus coupler 214 arranged to optically couple to the ring resonator 230 (FIG. 23). In at least some additional or alternative embodiments, forming the waveguide layer in the method 600 could further include forming two or more optical bus couplers arranged to optically couple to the ring resonator 230.

In at least some embodiments, depositing the waveguide material on portions of the substrate 650 could include creating the waveguide layer using a Damascene process flow. It is contemplated that the Damascene process flow could be applied to formation of any of the waveguide layers deposited in the method 600. In such a case, the method 600 could thus further include etching at least one groove in the substrate 650 and depositing the waveguide material over portions of the substrate 650 including the at least one groove. In order to provide a flat top surface for additional layer deposition, the method 600 could further thus include performing chemical-mechanical polishing (CMP) to remove excess portions of the waveguide material deposited exterior to the at least one groove.

The method 600 continues, at step 620, with depositing a first dielectric layer 660 over the waveguide layer 292 and portions of the substrate 650 to form a first top cladding for the first waveguide core layer 292. In the present embodiment, silicon dioxide ($SiO_2$) is deposited, but it is contemplated that different materials could be used.

In at least some embodiments, the method 600 then continues with CMP followed by bonding a glass wafer 655 to the dielectric layer 660. As is illustrated in FIG. 23, the waveguide 292, including both the ring resonator 230 and the bus coupling 214, and the dielectric layer 660 and sandwiched between two glass substrates 650, 655. Depending on the embodiment, the two glass substrates 650, 655 could be made from the same or different glass materials.

Figure 22:
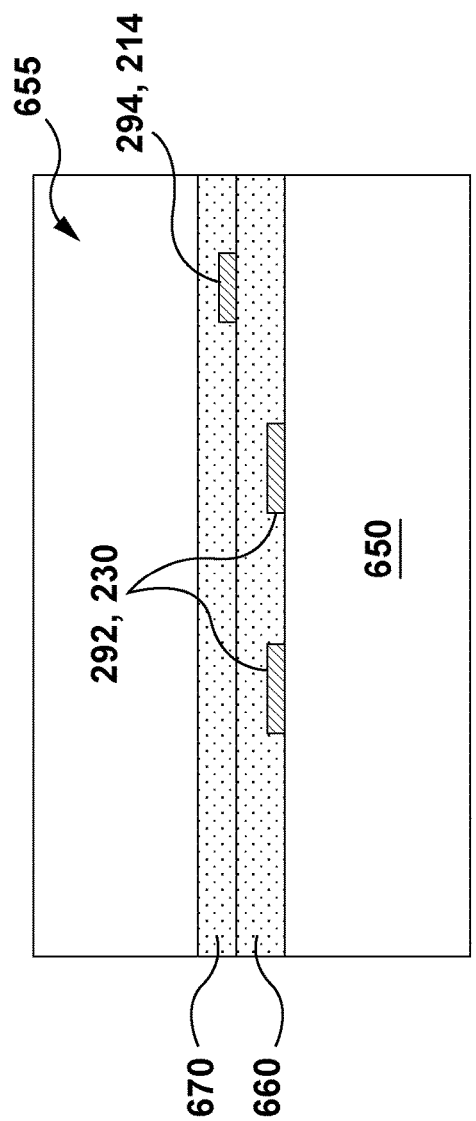
FIG. 22 is a schematic, cross-sectional view of another non-limiting embodiment of a photonic integrated circuit chip.

In at least some other embodiments, the method 600 could include depositing additional waveguide and/or dielectric layers prior to bonding the glass wafer 655 to a top side of the chip assembly. For example, as is illustrated in FIG. 22, the method 600 could further include depositing a second waveguide material on portions of the first dielectric layer 660 to form the second waveguide core layer 294. To smooth the top surface of this waveguide material, a CMP is generally performed prior to lithography. In contrast to the chip illustrated in FIG. 23, the second waveguide core layer 294 includes the optical bus coupler 214 arranged to optically couple to the ring resonator 230 in the first waveguide layer 292. In such an embodiment, the method 600 would then generally include depositing a second dielectric layer 670 over the second waveguide layer 294. As with the embodiment described above, the method 600 would then include bonding the glass wafer 655 to a topmost layer of the chip assembly, in this case specifically the second dielectric layer 670.

In some embodiments, it is also contemplated that the method 600 could include depositing the second dielectric layer 670 and the second waveguide material on the second glass wafer 655, rather than on the first dielectric layer 660. In such a case, the method 600 could then include bonding the assembly of the second dielectric layer 670, the second waveguide material, and the wafer 655 to the substrate 650, the first waveguide layer, and the first dielectric layer 660 via the second dielectric layer 670 and the first dielectric layer 660.

As is described above, the chip 200 could include an integrated laser chip, such as the III-V laser chip 505 illustrated in FIG. 18. To include the laser chip 505 in the chip 200, the method 600 could further include etching a recess in dielectric material and integrating the III-V laser chip 505 into the recess. In the illustrated example, the laser chip 505 is integrated into second substrate 655. The substrate 655, with the laser chip 505, is then bonded to the assembly of the one or two waveguide layers, the one or to dielectric layers 660, 670, and the substrate 650. As is mentioned above, in at least some embodiments including the laser chip 505, the method 600 could include forming one or more filter elements (such as a FB filter or ring filter), generally in waveguide material at least partially in a same plane as the laser chip 505.

It is also contemplated that the laser chip 505 could be incorporated into the assembly deposited on the substrate 650. For example, a recess could be etched into the dielectric layer 670 and/or the dielectric layer 660 for receiving the laser chip 505 therein. In some embodiments, the method 600 could also further include forming, in the waveguide material, at least one filter element optically coupled to the laser chip 505. The method 600 could then further include forming, in the waveguide material, a waveguide extending from at least the laser chip 505 to the ring resonator 230 wherein at least a portion of the waveguide is disposed adjacent to the filter element.

In at least some embodiments, the method 600 could further include performing chemical-mechanical polishing (CMP) on a top surface one or more of the material layers following various steps of the method 600, including but not limited to: depositing the first dielectric material, depositing the second dielectric material, depositing the first waveguide material, and depositing the second waveguide material.

In at least some embodiments, the substrate 650 could be replaced by a silicon wafer with wet thermal oxide having at least 15 micron thickness or a silicon wafer with oxide deposited multiple times thereon by flame hydrolysis deposition (FHD) method or a silicon wafer with at least 10 micron thickness wet thermal oxide and 5 micron additional PECVD on top of it. In such as case, the method 600 could further include depositing at least one oxide layer prior to depositing the waveguide layer in order to prepare the substrate surface. In at least some embodiments, the method 600 could further include deposition of a very thin silicon nitride layer after each silicon nitride etching to further smoothen the sidewall roughness of etched silicon nitride.

It is contemplated that the method 600 could include additional or different steps, either to perform additional functions and/or to perform the steps described above. In at least some embodiments, additional steps performed in the method 600 could include one or more steps from the method 400 described above.

Modifications and improvements to the above-described embodiments of the present technology may become apparent to those skilled in the art. The foregoing description is intended to be exemplary rather than limiting.

The invention claimed is:

1. A photonic integrated circuit (PIC) chip for an optical ring resonator-based gyroscope, the PIC chip comprising:
   a substrate;
   a dielectric layer deposited on the substrate;
   a first waveguide layer encapsulated in the dielectric layer, the first waveguide layer forming at least:
      a ring resonator, and
      a plurality of reflector portions;
   a second waveguide layer encapsulated in the dielectric layer, the first waveguide layer being disposed vertically between the substrate and the second waveguide layer, the second waveguide layer forming at least:
      a plurality of vertical Bragg grating couplers, each one of the plurality of vertical Bragg grating couplers being disposed over one of the plurality of reflector portions,
      a chip waveguide optically coupling the ring resonator to the plurality of vertical Bragg grating couplers;
   a magneto-optic layer encapsulated in the dielectric layer, the magneto-optic layer being arranged over a first portion of the chip waveguide to form at least one circulator, the magneto-optic layer forming a permanent magnet generating a magnetic field through the first portion of the chip waveguide; and
   a metal layer disposed on the dielectric layer, the metal layer forming a plurality of metal connection pads and a plurality of wire traces for electrically connecting the PIC chip to electronic components.

2. The PIC chip of claim 1, wherein the magneto-optic layer further extends over a second portion of the chip waveguide to form at least one optical isolator along the chip waveguide.

3. The PIC chip of claim 1, wherein the plurality of metal connection pads comprises:
   a first pair of metal connection pads arranged to receive a laser assembly by flip-chip bonding;
   a second pair of metal connection pads arranged to receive a first photodetector assembly by flip-chip bonding; and
   a third pair of metal connection pads arranged to receive a second photodetector assembly by flip-chip bonding.

4. The PIC chip of claim 3, wherein:
   the first pair of metal connection pads is arranged to align the laser assembly with a first one of the plurality of vertical Bragg grating couplers;
   the second pair of metal connection pads is arranged to align the first photodetector assembly with a second one of the plurality of vertical Bragg grating couplers; and
   the third pair of metal connection pads is arranged to align the second photodetector assembly with a third one of the plurality of vertical Bragg grating couplers.

5. A method for fabricating a photonic integrated circuit for a ring resonator optical gyroscope, the method comprising:
   depositing a first dielectric layer to form a bottom waveguide cladding on a substrate;
   depositing a first waveguide material on portions of the first dielectric layer to form a first waveguide core layer, the first waveguide core layer forming:
      a ring resonator, and
      a plurality of lower reflector portions;
   depositing a second dielectric layer over the first waveguide core layer and portions of the first dielectric layer, the second dielectric layer forming a first top cladding for the first waveguide core layer;

depositing a second waveguide material on portions of the second dielectric layer to form a second waveguide core layer, the second waveguide core layer forming:
  a plurality of vertical Bragg grating couplers, each one of the plurality of vertical Bragg grating couplers being disposed over a corresponding one of the plurality of lower reflector portions, and
  a chip waveguide optically coupling the ring resonator to the plurality of vertical Bragg grating couplers,
depositing a magneto-optic material on portions of the second waveguide core layer, the magneto-optic material configured to form a permanent magnet generating a magnetic field through at least the second waveguide core layer, a combination of the magneto-optic material and portions of the second waveguide core layer forming at least one optical circulator optically coupled to the chip waveguide; and
depositing a third dielectric layer over the second waveguide core layer, the magneto-optical material, and portions of the second dielectric layer, the third dielectric layer forming a second top cladding layer for the second waveguide core layer.

6. The method of claim 5, further comprising:
bonding a III-V laser chip after depositing one of the first dielectric layer and the second dielectric layer; and
forming at least one filter element in one of the first waveguide core later layer and the second waveguide core layer.

7. The method of claim 5, further comprising:
depositing a metal layer on portions of the third dielectric layer, the metal layer forming at least a plurality of electrical connection pads configured and arranged for receiving electrical connections.

8. The method of claim 5, wherein a material of the second dielectric layer and a material of the third dielectric material are a same dielectric layer.

9. The method of claim 5, wherein depositing the magneto-optic material includes forming an optical isolator on the chip waveguide.

10. The method of claim 5, wherein depositing the magneto-optic material includes forming at least one circulator on the chip waveguide.

11. The method of claim 5, further comprising bonding a glass wafer to the third dielectric layer.

12. The method of claim 5, further comprising:
etching a recess in at least a portion of the third dielectric layer; and
integrating a III-V laser chip into the recess.

13. The method of claim 5, wherein the substrate is a silicon substrate; and
further comprising:
  etching through all deposited layers to reach the silicon substrate; and
  performing an isotropic dry etch of the silicon substrate using XeF2 gas.

* * * * *